United States Patent
Gou et al.

(10) Patent No.: US 12,439,444 B2
(45) Date of Patent: Oct. 7, 2025

(54) UPLINK TRANSMISSION METHOD AND DEVICE REUSING SYMBOL RESOURCES, COMMUNICATION NODE AND STORAGE MEDIUM

(71) Applicant: ZTE CORPORATION, Shenzhen (CN)

(72) Inventors: Wei Gou, Shenzhen (CN); Peng Hao, Shenzhen (CN); Xianghui Han, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 493 days.

(21) Appl. No.: 17/793,284

(22) PCT Filed: Jan. 15, 2021

(86) PCT No.: PCT/CN2021/071967
§ 371 (c)(1),
(2) Date: Jul. 15, 2022

(87) PCT Pub. No.: WO2021/143790
PCT Pub. Date: Jul. 22, 2021

(65) Prior Publication Data
US 2023/0039461 A1   Feb. 9, 2023

(30) Foreign Application Priority Data

Jan. 17, 2020  (CN) .......................... 202010054691.9

(51) Int. Cl.
*H04W 72/566*   (2023.01)
*H04L 5/00*   (2006.01)
(Continued)

(52) U.S. Cl.
CPC ......... *H04W 72/569* (2023.01); *H04L 5/0055* (2013.01); *H04W 72/1268* (2013.01); *H04W 72/20* (2023.01)

(58) Field of Classification Search
None
See application file for complete search history.

(56) References Cited

U.S. PATENT DOCUMENTS

2015/0358125 A1* 12/2015 Yang ..................... H04L 1/1854
                                                       370/329
2018/0020447 A1   1/2018 Thubert et al.
(Continued)

FOREIGN PATENT DOCUMENTS

CN   110535555 A   12/2019
CN   110536463 A   12/2019
(Continued)

OTHER PUBLICATIONS

Supplementary Partial European Search Report for U.S. Appl. No. 21/740,739, dated Jan. 24, 2024, 15 pages.
(Continued)

*Primary Examiner* — Diane L Lo
(74) *Attorney, Agent, or Firm* — MORGAN, LEWIS & BOCKIUS LLP

(57) ABSTRACT

Provided are an uplink transmission method and device, a communication node and a storage medium. The uplink transmission method includes: cancelling a transmission of part or all of time domain symbols in a first uplink transmission in a case where the first uplink transmission overlaps with a second uplink transmission in a time domain, where the first uplink transmission corresponds to a first priority, the second uplink transmission corresponds to a second priority, and the first priority is lower than the second priority; and transmitting a third uplink transmission through time domain symbols of which the transmission is (Continued)

cancelled in the first uplink transmission in a case where a set condition is satisfied.

17 Claims, 5 Drawing Sheets

(51) Int. Cl.
*H04W 72/1268* (2023.01)
*H04W 72/20* (2023.01)

(56) References Cited

U.S. PATENT DOCUMENTS

| | | | |
|---|---|---|---|
| 2019/0261391 A1 | 8/2019 | Kundu et al. | |
| 2020/0229202 A1* | 7/2020 | Bagheri | H04L 25/0226 |
| 2024/0073887 A1* | 2/2024 | Bae | H04W 72/21 |

FOREIGN PATENT DOCUMENTS

| | | |
|---|---|---|
| CN | 110536464 A | 12/2019 |
| CN | 111901868 A | 11/2020 |
| CN | 111901882 A | 11/2020 |
| WO | 2017078595 A1 | 5/2017 |
| WO | 2019154191 A1 | 8/2019 |

OTHER PUBLICATIONS

Nokia et al., "Solution for UL inter-UE multiplexing between eMBB and URLLC", 3GPP TSG-RAN WG1 AH #1901, R1-1900391, Jan. 21, 2019, 11 pages.

Nokia et al., "Discussion on enhancements to scheduling/HARQ for NR URLLC", 3GPP TSG RAN WG1 Meeting #96 bis, R1-1904829, Apr. 8, 2019, 6 pages.

ZTE. "Remaining issues on UL control enhancements for NR URLLC", R1-2001612, 3GPP TSG RAN WG1 #100bis, Apr. 24, 2020, 11 pp.

ZTE. "UL control enhancements for NR URLLC", R1-1911964, 3GPP TSG RAN WG1 #99, Nov. 22, 2019, 12 pp.

VIVO. "UCI enhancements for URLLC", R1-1912031, 3GPP TSG RAN WG1 #99, Nov. 22, 2019, 11 pp.

ERICSSON. "On intra-UE prioritization enablers", R1-1906097, 3GPP TSG RAN WG1 Meeting #97, May 17, 2019, 11pp.

International Search Report for Application No. PCT/CN2021/071967, dated Apr. 16, 2021, 6 pages including English translation.

First Search Report in Chinese Application No. 2020100546919, dated Dec. 24, 2024, 7 pages, including translation.

First Office Action in Chinese Application No. 202010054691.9, dated Dec. 28, 2024, 18 pages, including translation.

* cited by examiner

UPLINK TRANSMISSION METHOD AND DEVICE REUSING SYMBOL RESOURCES, COMMUNICATION NODE AND STORAGE MEDIUM

CROSS REFERENCE TO RELATED APPLICATIONS

This is a National Stage Application, filed under 35 U.S.C. 371, of International Patent Application No. PCT/CN2021/071967, filed on Jan. 15, 2021, which is based on and claims priority to Chinese Patent Application No. 202010054691.9 filed with the China National Intellectual Property Administration (CNIPA) on Jan. 17, 2020, the disclosures of which are incorporated herein by reference in their entireties.

TECHNICAL FIELD

The present application relates to wireless communication networks, and for example, an uplink transmission method and device, a communication node, and a storage medium.

BACKGROUND

In a new radio (NR) of a fifth generation mobile communication technology, a communication node may support different types of traffic transmissions, such as an enhanced mobile broadband (eMBB) traffic transmission, an uplink channel transmission related to an eMBB traffic, an ultra reliable low latency communication (URLLC) traffic transmission, and an uplink channel transmission related to an URLLC traffic. But in a case where two uplink transmissions overlap in a time domain, the two uplink transmissions cannot be transmitted simultaneously. At present, an effective mechanism for determining how to handle a transmission of two uplink transmissions with overlapping time domains is lacking, and thus the reliability of the uplink transmission is poor.

SUMMARY

The present application provides an uplink transmission method and device, a communication node and a storage medium so as to improve the reliability of an uplink transmission.

An embodiment of the present application provides an uplink transmission method. The uplink transmission method includes: cancelling a transmission of part or all of time domain symbols in a first uplink transmission in a case where the first uplink transmission overlaps with a second uplink transmission in a time domain, where the first uplink transmission corresponds to a first priority, the second uplink transmission corresponds to a second priority, and the first priority is lower than the second priority; and transmitting a third uplink transmission through time domain symbols of which the transmission is cancelled in the first uplink transmission in a case where a set condition is satisfied.

An embodiment of the present application further provides an uplink transmission method. The uplink transmission method includes: determining a starting symbol of which a transmission of a first uplink transmission is cancelled in a case where the first uplink transmission overlaps with a second uplink transmission in a time domain, where the first uplink transmission corresponds to a first priority, the second uplink transmission corresponds to a second priority, and the first priority is lower than the second priority; and cancelling a transmission of part or all of time domain symbols in the first uplink transmission according to the starting symbol.

An embodiment of the present application further provides an uplink transmission device. The uplink transmission device includes a first cancellation module and a transmission module. The first cancellation module is configured to cancel a transmission of part or all of time domain symbols in a first uplink transmission in a case where the first uplink transmission overlaps with a second uplink transmission in a time domain, where the first uplink transmission corresponds to a first priority, the second uplink transmission corresponds to a second priority, and the first priority is lower than the second priority. The transmission module is configured to transmit a third uplink transmission through time domain symbols of which the transmission is cancelled in the first uplink transmission in a case where a set condition is satisfied.

An embodiment of the present application further provides an uplink transmission device, the uplink transmission device includes a starting symbol determination module and a second cancellation module. The starting symbol determination module is configured to determine a starting symbol of which a transmission of a first uplink transmission is cancelled in a case where the first uplink transmission overlaps with a second uplink transmission in a time domain, where the first uplink transmission corresponds to a first priority, the second uplink transmission corresponds to a second priority, and the first priority is lower than the second priority. The second cancellation module is configured to cancel a transmission of part or all of time domain symbols in the first uplink transmission according to the starting symbol.

An embodiment of the present application further provides a communication node. The communication node includes one or more processors and a storage apparatus. The storage apparatus is configured to store one or more programs, where the one or more programs, when executed by the one or more processors, cause the one or more processors to implement the uplink transmission method described above.

An embodiment of the present application further provides a computer-readable storage medium. The computer-readable storage medium stores a computer program, and the computer program, when executed by a processor, implements the uplink transmission method described above.

DETAILED DESCRIPTION

Figure 1:
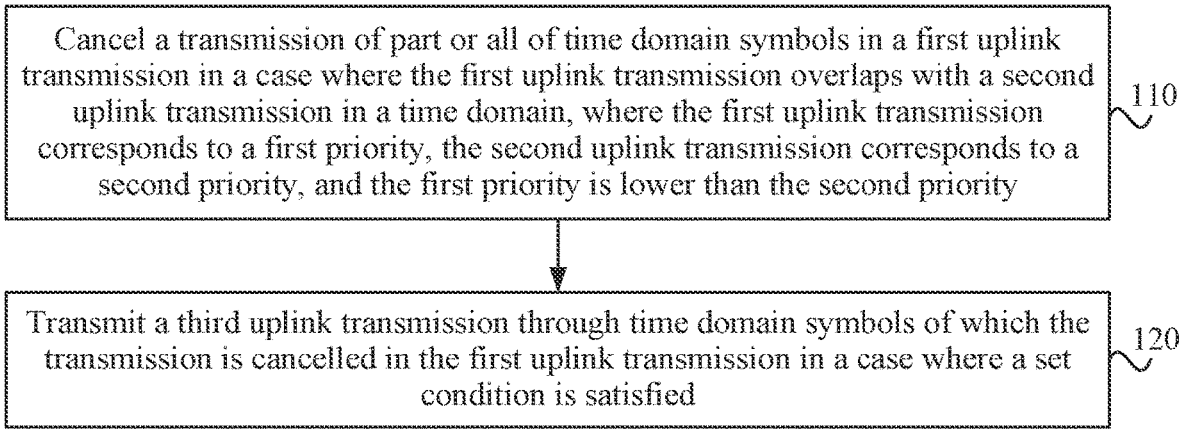
FIG. 1 is a flowchart of an uplink transmission method provided in an embodiment.

The present application is described below in conjunction with the drawings and embodiments. It should be understood that the specific embodiments described herein are used only for the purpose of interpreting the present application and not as a limitation to the present application. It should be noted that the embodiments in the present application and the features in the embodiments may be arbitrarily combined without conflict. It should also be noted that, for ease of description, only some, but not all, of the structures related to the present application are shown in the drawings.

In the New Radio (NR) of the fifth generation of mobile communication technology, a user equipment (UE) may support different types of traffic transmission, but only one uplink channel is allowed to be transmitted within a certain period when the complexity of UE implementation is considered, and in a case of two uplink channels overlapping in a time domain, the UE may only select to transmit one of the uplink channels, and the other one is cancelled to transmit. An effective mechanism for determining how to process transmission of two uplink transmissions with overlapped time domains, for example, how to reuse cancelled resources, how to determine a cancelled starting position, is lacked, so that an uplink transmission scheduling is poor both in flexibility and reliability.

In an embodiment of the present application, an uplink transmission method is provided, in a case of two uplink transmissions overlapping in a time domain, an uplink transmission with a first priority is cancelled, and the cancelled time domain symbol may be multiplexed for a third uplink transmission, so that the utilization rate of resources and the flexibility of the scheduling are improved, and thus the reliability of the uplink transmission is improved.

FIG. 1 is a flowchart of an uplink transmission method provided in an embodiment, as shown in FIG. 1, and the method provided in this embodiment includes 110 and 120.

In 110, a transmission of part or all of time domain symbols in a first uplink transmission is cancelled in a case where the first uplink transmission overlaps with a second uplink transmission in a time domain, where the first uplink transmission corresponds to a first priority, the second uplink transmission corresponds to a second priority, and the first priority is lower than the second priority.

In 120, a third uplink transmission is transmitted through time domain symbols of which the transmission is cancelled in the first uplink transmission in a case where a set condition is satisfied.

Figure 2:
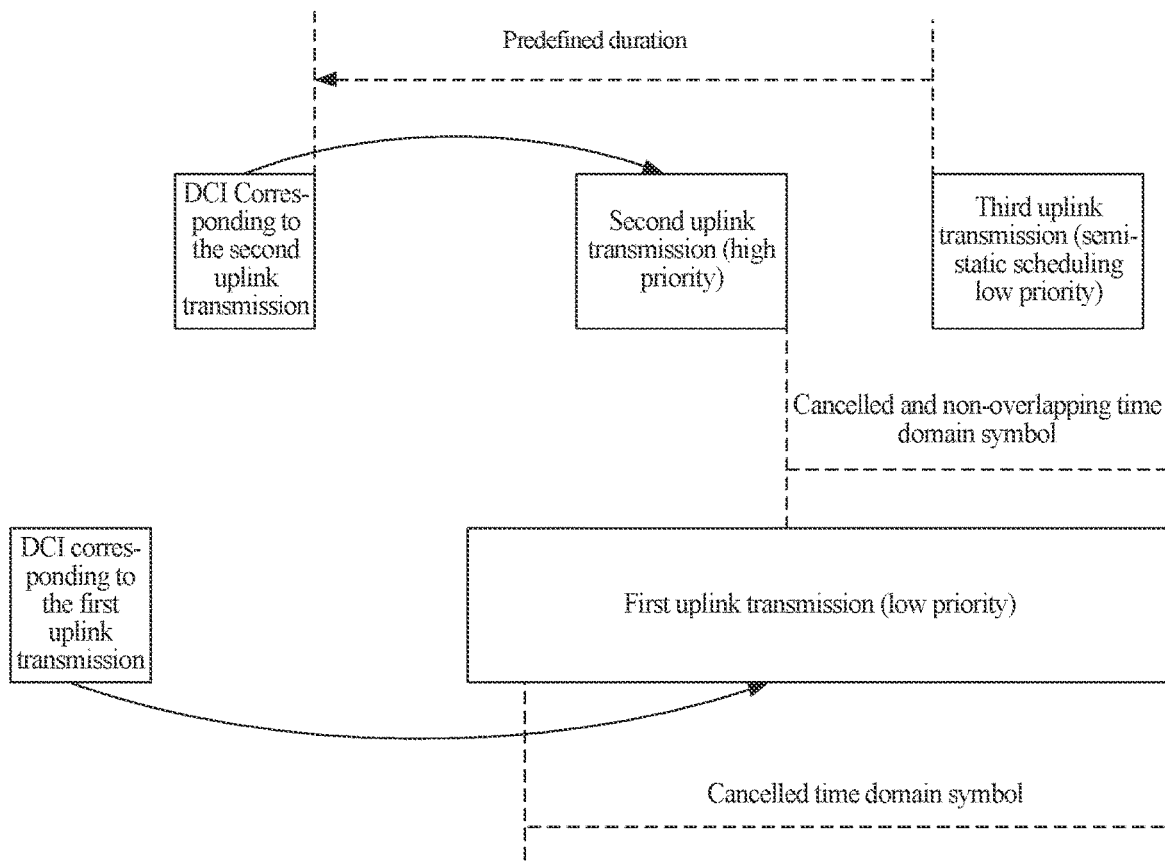
FIG. 2 is a diagram showing uplink transmissions overlapping in a time domain provided in an embodiment.

FIG. 2 is a diagram showing uplink transmissions overlapping in a time domain provided in an embodiment. As shown in FIG. 2, in a case where the first uplink transmission (low priority) overlaps with the second uplink transmission (high priority) in the time domain, time domain symbols of the first uplink transmission is wholly or partially cancelled, and in a case where the set condition is satisfied, in the cancelled time domain symbol, time domain symbols that do not overlap with the first uplink transmission in the time domain are allowed for a transmission of the third uplink transmission. Time domain symbol resources which are cancelled but non-overlapping in the first uplink transmission are multiplexed, so that the waste of resources is avoided, and thus the reliability of the uplink transmission is improved.

In an embodiment, the third uplink transmission corresponds to the first priority, and a scheduling type of the third uplink transmission is a semi-static scheduling; and the set condition includes: a predefined duration before a starting symbol of the third uplink transmission being later than a starting symbol or an end symbol of downlink control information (DCI) corresponding to the second uplink transmission.

In this embodiment, the third uplink transmission is a semi-statically scheduled uplink transmission with the first priority, and the semi-static scheduling refers to that the third uplink transmission does not need to be scheduled by DCI for an uplink transmission scheduling. In a case where the third uplink transmission satisfies a first time line, the cancelled time domain symbol may be used for a transmission of the third uplink transmission. As shown in FIG. 2, the first time line refers to that: a predefined duration from (a starting point of) the starting symbol of the third uplink transmission onward is later than (a starting point of) the starting symbol or (an end point of) the end symbol of the DCI corresponding to the second uplink transmission. In some embodiments, the first time line may also refer to that: a predefined duration from (a starting point of) the starting symbol of the third uplink transmission onward is no earlier than (a starting point of) the starting symbol or (an end point of) the end symbol of the DCI corresponding to the second uplink transmission. The predefined duration may be $T_{proc,2}$, $T_{proc,1}$ as defined in 3GPP TS38.214, or other predefined values, such as N1, N2, or N3 as defined in 3GPP TS38.214, or may be related to the capability reported by the UE.

In this embodiment, the first uplink transmission includes: a physical uplink control channel (PUCCH) for transmitting hybrid automatic repeat request-acknowledgement (HARQ-ACK) information with the first priority, a PUCCH for transmitting a scheduling request with the first priority, a PUCCH for transmitting periodic-channel state information (P-CSI) with the first priority, a physical uplink shared channel (PUSCH) for transmitting channel state information (CSI) with the first priority, a PUCCH for transmitting a beam failure recovery (BFR) with the first priority, a dynamically scheduled PUSCH for transmitting uplink data with the first priority, or a semi-statically scheduled PUSCH for transmitting uplink data with the first priority. In some embodiments, the first uplink transmission may also be a PUCCH that transmits a sounding reference signal (SRS) with the first priority or a PUCCH that transmits aperiodic-channel state information (A-CSI) with the first priority.

The predefined duration is determined according to types of the second uplink transmission or the third uplink transmission.

In an embodiment, the second uplink transmission includes: a PUCCH for transmitting a HARQ-ACK with the second priority, a PUCCH for transmitting a SR with the second priority, a PUSCH for transmitting CSI with the second priority, a PUCCH for transmitting a BFR with the second priority, a dynamically scheduled PUSCH for transmitting uplink data with the second priority, or a semi-statically scheduled PUSCH for transmitting uplink data with the second priority. In some embodiments, the second uplink transmission may also be a PUCCH for transmitting aperiodic channel state information with the second priority, and types of the second uplink transmission are different, and the corresponding predefined durations may also be different.

In an embodiment, the third uplink transmission includes: a physical uplink control channel (PUCCH) for transmitting a HARQ-ACK with the first priority, a PUCCH for transmitting a SR with the first priority, a PUSCH for transmitting CSI with the first priority, a PUCCH for transmitting a BFR with the first priority, a dynamically scheduled PUSCH for transmitting uplink data with the first priority, or a semi-statically scheduled PUSCH for transmitting uplink data with the first priority. In some embodiments, the third uplink transmission may also be may also be a PUCCH that transmits a SRS with the first priority or a PUCCH that transmits A-CSI with the first priority, types of the third uplink transmission are different, and the corresponding predefined durations may also be different.

In this embodiment, after the DCI corresponding to the second uplink transmission (high priority) is received, the UE may know a starting position of the cancelled time domain symbol of the first uplink transmission (low priority). On this basis, the time line does not need to be detected by the third uplink transmission and the second uplink transmission together, and an enough duration is available to prepare for transmission of the third uplink transmission, so that the third uplink transmission is transmitted through the cancelled and non-overlapping time domain symbols.

In an embodiment, the third uplink transmission corresponds to the first priority, and a scheduling type of the third uplink transmission is a dynamic scheduling. The set condition includes: a starting symbol of the third uplink transmission being later than a predefined duration after an end symbol of downlink control information (DCI) corresponding to the third uplink transmission; a starting symbol of the downlink control information corresponding to the third uplink transmission being later than a starting symbol of downlink control information corresponding to the second uplink transmission, or the end symbol of the downlink control information corresponding to the third uplink transmission being later than an end symbol of downlink control information corresponding to the second uplink transmission.

Figure 3:
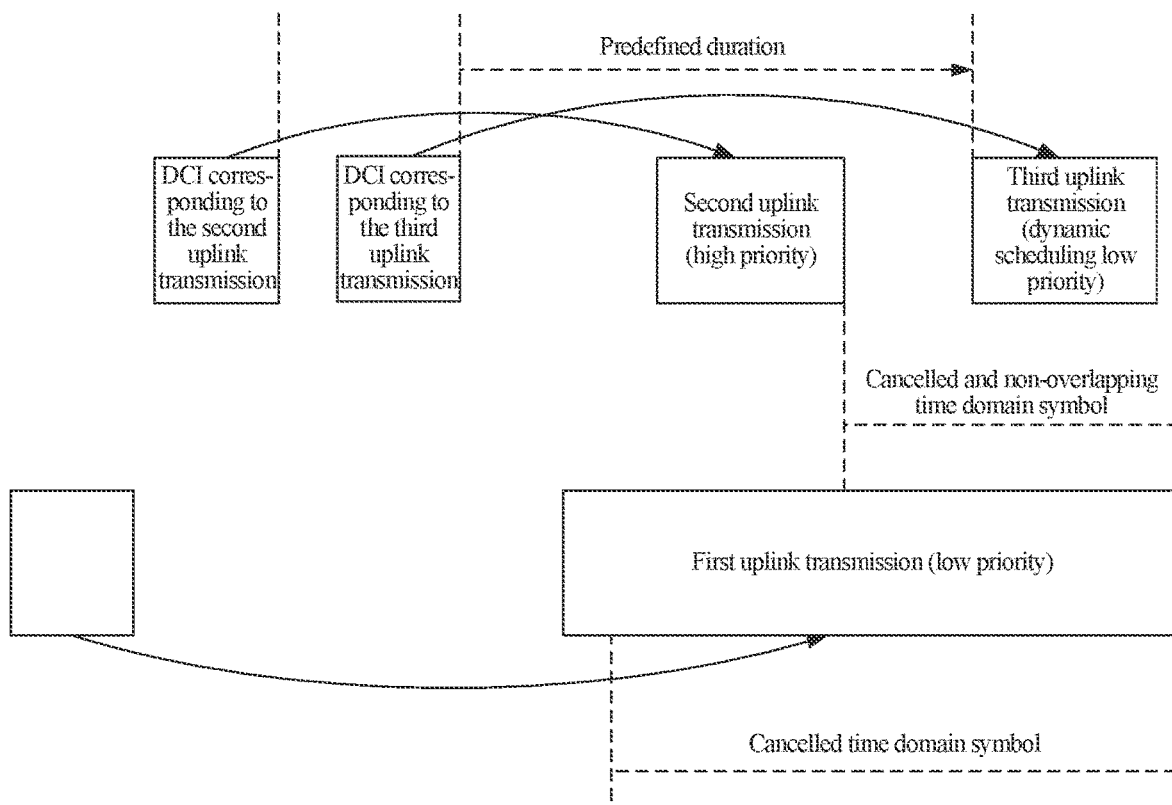
FIG. 3 is a diagram showing uplink transmissions overlapping in a time domain provided in another embodiment.

FIG. 3 is a diagram showing uplink transmissions overlapping in a time domain provided in another embodiment. As shown in FIG. 3, in a case where the first uplink transmission (low priority) overlaps with the second uplink transmission (high priority) in the time domain, time domain symbols of the first uplink transmission is wholly or partially cancelled, and in a case where the set condition is satisfied, in the cancelled time domain symbol, time domain symbols that do not overlap with the first uplink transmission in the time domain are allowed for a transmission of the third uplink transmission.

In this embodiment, the third uplink transmission is a dynamically scheduled uplink transmission with the first priority, and the dynamic scheduling refers to that the third uplink transmission needs to be scheduled by DCI for an uplink transmission scheduling. In a case where the third uplink transmission satisfies a second time line, the cancelled time domain symbol may be used for a transmission of the third uplink transmission. As shown in FIG. 3, the second time line refers to that: (a starting point of) a starting symbol of the third uplink transmission is later than a predefined duration after (an end point of) an end symbol of DCI corresponding to the third uplink transmission; (a starting point of) a starting symbol of the DCI corresponding to the third uplink transmission is later than (a starting point of) a starting symbol of DCI corresponding to the second uplink transmission, or (an end point of) an end symbol of the DCI corresponding to the third uplink transmission is later than (an end point of) an end symbol of DCI corresponding to the second uplink transmission. In some embodiments, the second time line may also refer to that: (a starting point of) a starting symbol of the third uplink transmission is no earlier than a predefined duration after (an end point of) an end symbol of DCI corresponding to the third uplink transmission; (a starting point of) a starting symbol of the DCI corresponding to the third uplink transmission is no earlier than (a starting point of) a starting symbol of DCI corresponding to the second uplink transmission, or (an end point of) an end symbol of the DCI corresponding to the third uplink transmission is no earlier than (an end point of) an end symbol of DCI corresponding to the second uplink transmission. The predefined duration may be $T_{proc,2}$, $T_{proc,1}$ as defined in 3GPP TS38.214, or other predefined values, such as N1, N2, or N3 as defined in 3GPP TS38.214, or may be related to the capability reported by the UE.

In this embodiment, the predefined duration is determined according to types of the second uplink transmission or the third uplink transmission, types of the second uplink transmission are different, and the corresponding predefined durations may also be different; types of the third uplink transmission are different, and the corresponding predefined durations may also be different.

In this embodiment, the starting symbol (or the end symbol) of the DCI corresponding to the third uplink transmission is later than or no earlier than the starting symbol (or the end symbol) of the DCI corresponding to the second uplink transmission, and on this basis, the UE may learn that the transmission of the first uplink transmission is cancelled from a certain time domain symbol, and the time line does not need to be detected by the third uplink transmission and the second uplink transmission together; and the third uplink transmission is scheduled after a predefined duration after the DCI corresponding to the third uplink transmission, and an enough duration is available to prepare for transmission of the third uplink transmission, so that the third uplink transmission is transmitted through the canceled and non-overlapping time domain symbols.

In an embodiment, the set condition further includes: a starting symbol of the DCI corresponding to the second uplink transmission being later than a starting symbol of the DCI corresponding to the first uplink transmission, or an end symbol of the DCI corresponding to the second uplink transmission being later than an end symbol of the DCI corresponding to the first uplink transmission.

In this embodiment, the starting symbol (or the end symbol) of the DCI corresponding to the second uplink transmission is later than the starting symbol (or the end symbol) of the DCI corresponding to the first uplink transmission, whereby it is ensured that a transmission of all or part of time domain symbols of the first uplink transmission is cancelled in a case where the time domains overlap. In this embodiment, the starting symbol refers to the starting point of the starting symbol, and the end symbol refers to the end point of the end symbol. In some embodiments, the set condition further includes: the starting symbol (or the end symbol) of the DCI corresponding to the second uplink transmission being no earlier than the starting symbol (or the end symbol) of the DCI corresponding to the first uplink transmission.

In an embodiment, the third uplink transmission corresponds to the second priority, and a scheduling type of the third uplink transmission is a is a semi-static scheduling; and the set condition includes: a predefined duration before a starting symbol of the third uplink transmission being later than a starting symbol or an end symbol of downlink control information corresponding to the second uplink transmission.

Figure 4:
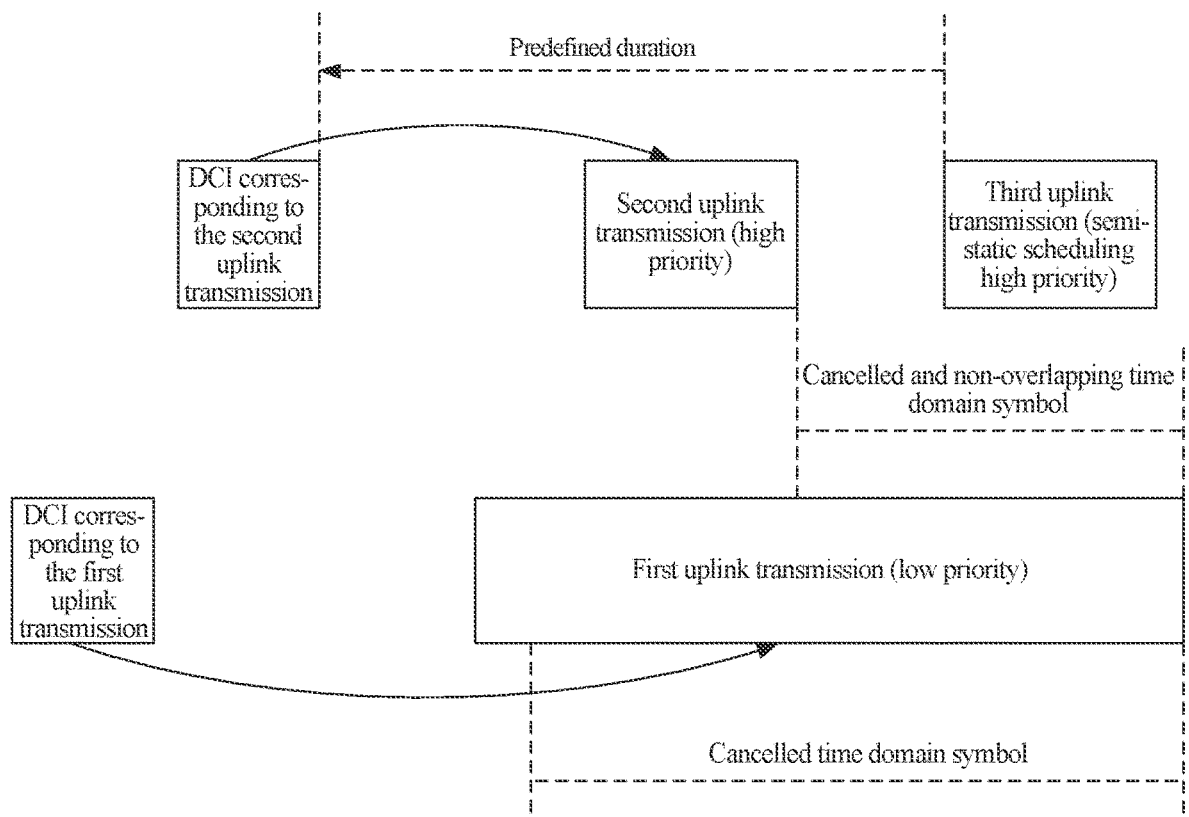
FIG. 4 is a diagram showing uplink transmissions overlapping in a time domain provided in another embodiment.

FIG. 4 is a diagram showing uplink transmissions overlapping in a time domain provided in another embodiment. As shown in FIG. 4, in a case where the first uplink transmission (low priority) overlaps with the second uplink transmission (high priority) in the time domain, time domain symbols of the first uplink transmission is wholly or partially cancelled, and in a case where the set condition is satisfied, in the cancelled time domain symbol, time domain symbols that do not overlap with the first uplink transmission in the time domain are allowed for a transmission of the third uplink transmission.

In this embodiment, the third uplink transmission is a semi-statically scheduled uplink transmission with the first priority. In a case where the third uplink transmission satisfies a third time line, the cancelled time domain symbol may be used for a transmission of the third uplink transmission. As shown in FIG. 4, the third time line refers to that: a predefined duration before (a starting point of) a starting symbol of the third uplink transmission is later than (a starting point of) a starting symbol or (an end point of) an end symbol of DCI corresponding to the second uplink transmission. In some embodiments, the third time line may refer to that: a predefined duration before (a starting point of) a starting symbol of the third uplink transmission is no earlier than (a starting point of) a starting symbol or (an end point of) an end symbol of DCI corresponding to the second uplink transmission. The predefined duration may be $T_{proc,2}$, $T_{proc,1}$ as defined in 3GPP TS38.214, or other predefined values, such as N1, N2, or N3 as defined in 3GPP TS38.214, or may be related to the capability reported by the UE.

In this embodiment, the predefined duration is determined according to types of the second uplink transmission and the third uplink transmission, types of the second uplink transmission are different, and the corresponding predefined durations may also be different; types of the third uplink transmission are different, and the corresponding predefined durations may also be different.

In this embodiment, a predefined duration before a starting position of the third uplink transmission is later than the end symbol of the DCI corresponding to the second uplink transmission, and an enough duration is available to prepare for transmission of the third uplink transmission, so that the third uplink transmission is transmitted through the cancelled and non-overlapping time domain symbols.

In an embodiment, the third uplink transmission corresponds to the second priority, and a scheduling type of the third uplink transmission is a dynamic scheduling. The set condition includes: the starting symbol of the third uplink transmission being later than a predefined duration after an end symbol of DCI corresponding to the third uplink transmission; a starting symbol of the DCI corresponding to the third uplink transmission being later than a starting symbol of DCI corresponding to the second uplink transmission, or the end symbol of the DCI corresponding to the third uplink transmission being later than an end symbol of the DCI corresponding to the second uplink transmission; where the third uplink transmission does not overlap with the second uplink transmission in a time domain.

Figure 5:
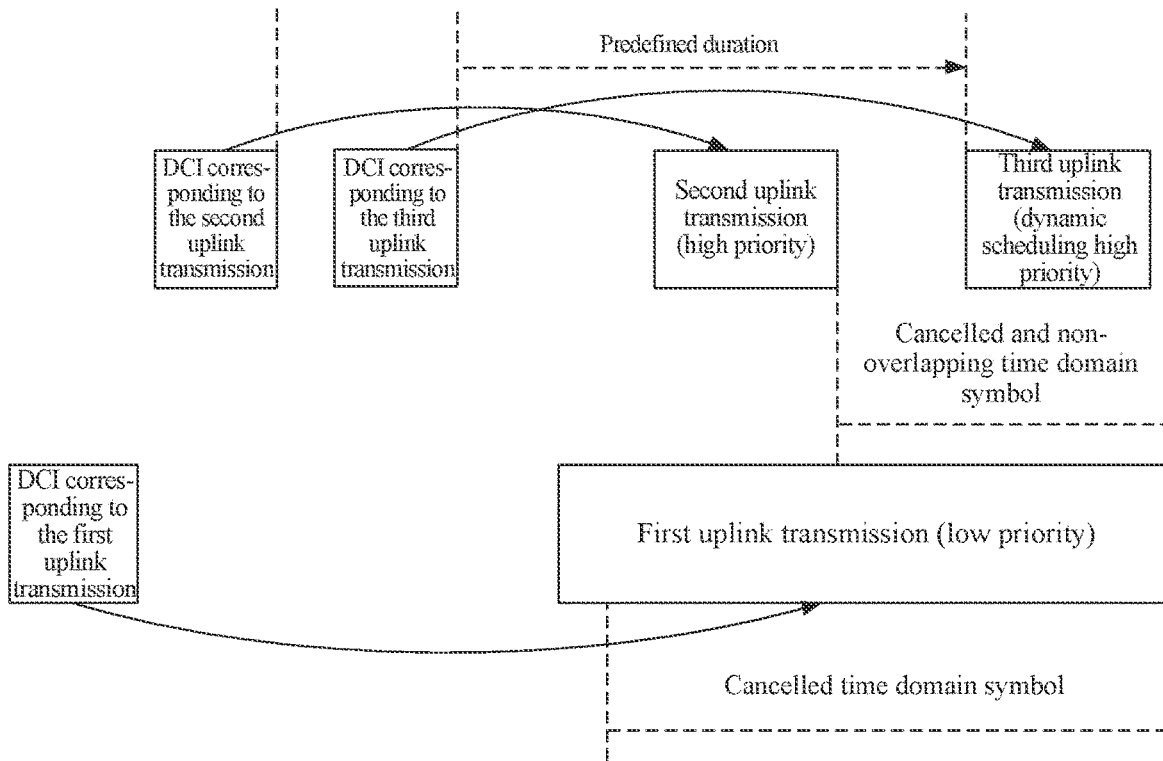
FIG. 5 is a diagram showing uplink transmissions overlapping in a time domain provided in still another embodiment.

FIG. 5 is a diagram showing uplink transmissions overlapping in a time domain provided in still another embodiment. As shown in FIG. 5, in a case where the first uplink transmission (low priority) overlaps with the second uplink transmission (high priority) in the time domain, time domain symbols of the first uplink transmission is wholly or partially cancelled, and in a case where the set condition is satisfied, in the cancelled time domain symbol, time domain symbols that do not overlap with the first uplink transmission in the time domain are allowed for a transmission of the third uplink transmission.

In this embodiment, the third uplink transmission is a semi-statically scheduled uplink transmission with the first priority. In a case where the third uplink transmission satisfies a fourth time line, the cancelled time domain symbol may be used for a transmission of the third uplink transmission. As shown in FIG. 5, the fourth time line refers to that: (a starting point of) a starting symbol of the third uplink transmission is later than a predefined duration after (an end point of) an end symbol of DCI corresponding to the second uplink transmission; (a starting point of) a starting symbol of DCI corresponding to the third uplink transmission is later than (a starting point of) a starting symbol of the DCI corresponding to the second uplink transmission, or (an end point of) an end symbol of the DCI corresponding to the third uplink transmission is later than (the end point of) the end symbol of the DCI corresponding to the second uplink transmission. In some embodiments, the fourth time line may refer to that: (a starting point of) a starting symbol of the third uplink transmission is no earlier than a predefined duration after (an end point of) an end symbol of DCI corresponding to the second uplink transmission; (a starting point of) a starting symbol of DCI corresponding to the third uplink transmission is no earlier than (a starting point of) a starting symbol of the DCI corresponding to the second uplink transmission, or (an end point of) an end symbol of the DCI corresponding to the third uplink transmission is no earlier than (the end point of) the end symbol of the DCI corresponding to the second uplink transmission. The predefined duration may be $T_{proc,2}$, $T_{proc,1}$ as defined in 3GPP TS38.214, or other predefined values, such as N1, N2, or N3 as defined in 3GPP TS38.214, or may be related to the capability reported by the UE.

In the embodiment, the predefined duration is determined according to types of the second uplink transmission and the third uplink transmission, types of the second uplink transmission are different, and the corresponding predefined durations may also be different; types of the third uplink transmission are different, and the corresponding predefined durations may also be different.

In this embodiment, the third uplink transmission is scheduled after a predefined duration after the DCI corresponding to the third uplink transmission, the starting symbol (or the end symbol) of the DCI corresponding to the third uplink transmission is later than the starting symbol (or the end symbol) of the DCI corresponding to the second uplink transmission, and the third uplink transmission does not overlap with the second uplink transmission in the time domain. Therefore, sufficient time is provided for preparing to transmit the third uplink transmission, a reverse sequence transmission is avoided, and it is ensured that the sequence of the third uplink transmission and the second uplink transmission scheduled by the DCI is consistent with the sequence of transmission opportunities.

In an embodiment, the set condition further includes: the starting symbol of the DCI corresponding to the second uplink transmission being later than a starting symbol of DCI corresponding to the first uplink transmission, or the end symbol of the DCI corresponding to the second uplink transmission being later than an end symbol of the DCI corresponding to the first uplink transmission.

In this embodiment, the starting symbol (or the end symbol) of the DCI corresponding to the second uplink transmission is later than the starting symbol (or the end symbol) of the DCI corresponding to the first uplink transmission, whereby it is ensured that a transmission of all or part of time domain symbols of the first uplink transmission is cancelled in a case where the time domains overlap. In this embodiment, the starting symbol refers to the starting point of the starting symbol, and the end symbol refers to the end point of the end symbol. In some embodiments, the set condition may further include that: the starting symbol of the DCI corresponding to the second uplink transmission is no earlier than the starting symbol of the DCI corresponding to the first uplink transmission, or the end symbol of the DCI corresponding to the second uplink transmission is no earlier than the end symbol of the DCI corresponding to the first uplink transmission.

In an embodiment, the third uplink transmission corresponds to the second priority; and a transmission sequence of the third uplink transmission and the second uplink transmission is consistent with a scheduling sequence of the third uplink transmission and the second uplink transmission.

In the embodiment, the first uplink transmission overlaps with the second uplink transmission in the time domain, all or part of the time domain symbols in the first uplink transmission are cancelled transmission, the time domain symbols with a cancelled transmission are allowed for a transmission of the third uplink transmission, and the transmission sequence of the third uplink transmission and the second uplink transmission is consistent with the scheduling sequence of the third uplink transmission and the second uplink transmission, so that the reverse sequence transmission is forbidden, and it is ensured that the firstly scheduled second uplink transmission is also transmitted before the third uplink transmission.

In an embodiment, in a case where the third uplink transmission is of the first priority (e.g., the case shown in FIG. 2 and FIG. 3), the first uplink transmission or the third uplink transmission includes: a PUCCH for transmitting HARQ-ACK with the first priority, a PUCCH for transmitting a scheduling request with the first priority, a PUCCH for transmitting periodic-channel state information (P-CSI) with the first priority, a PUSCH for transmitting CSI with the first priority, a PUCCH for transmitting a BFR with the first priority, a dynamically scheduled PUSCH for transmitting uplink data with the first priority, or a semi-statically scheduled PUSCH for transmitting uplink data with the first priority. In some embodiments, the first uplink transmission or the third uplink transmission may also be a PUCCH for transmitting SRS with the first priority or a PUCCH for transmitting A-CSI with the first priority. The second uplink transmission includes: a PUCCH for transmitting a HARQ-ACK with the second priority, a PUCCH for transmitting a scheduling request with the second priority, a PUSCH for transmitting CSI with the second priority, a PUCCH for transmitting a BFR with the second priority, a dynamically scheduled PUSCH for transmitting uplink data with the second priority, or a semi-statically scheduled PUSCH for transmitting uplink data with the second priority. In some embodiments, the second uplink transmission may also include a PUCCH for transmitting A-CSI with the second priority.

In an embodiment, in a case where the third uplink transmission is of the second priority (e.g., the case shown in FIG. 4 and FIG. 5), the first uplink transmission includes: a PUCCH for transmitting an HARQ-ACK with the first priority, a PUCCH for transmitting a scheduling request with the first priority, a PUCCH for transmitting P-CSI with the first priority, a PUSCH for transmitting CSI with the first priority, a PUCCH for transmitting a BFR with the first priority, a dynamically scheduled PUSCH for transmitting uplink data with the first priority, or a semi-statically scheduled PUSCH for transmitting uplink data with the first priority. In some embodiments, the first uplink transmission a PUCCH for transmitting SRS with the first priority or a PUCCH for transmitting A-CSI with the first priority. The second uplink transmission or the third uplink transmission includes: a PUCCH for transmitting a HARQ-ACK with the second priority, a PUCCH for transmitting a scheduling request with the second priority, a PUSCH for transmitting CSI with the second priority, a PUCCH for transmitting a BFR with the second priority, a dynamically scheduled PUSCH for transmitting uplink data with the second priority, or a semi-statically scheduled PUSCH for transmitting uplink data with the second priority. In some embodiments, the second uplink transmission or the third uplink transmission may also be a PUCCH for transmitting A-CSI with the second priority.

In an embodiment, the third uplink transmission may be of the second priority or the first priority, and the predefined duration is determined according to a type of the third uplink transmission.

In an embodiment, in a case where the third uplink transmission is a PUCCH for transmitting a HARQ-ACK, the predefined duration is B1 or a sum of B1 and B2. Where B1 is a first set value, the first set value may be, such as, $T_{proc,1}$ in 3GPP TS38.214, or N1, or a pre-agreed value, and B2 is determined according to a processing capability reported by a terminal, and B2 is 0, 1 or 2.

In an embodiment, in a case where the third uplink transmission is a PUCCH for transmitting a scheduling request, the predefined duration is B1 or a sum of B1 and B2. Where B1 is a second set value, the second set value may be, such as, $T_{proc,1}$ in 3GPP TS38.214, or N1, or a pre-agreed value, and B2 is determined according to a processing capability reported by a terminal, and B2 is 0, 1 or 2.

In an embodiment, in a case where the third uplink transmission is a PUCCH for transmitting channel state information, the predefined duration is B1 or a sum of B1 and B2. Where B1 is a third set value, the third set value may be, such as, $T_{proc,CSI}$ in 3GPP TS38.214, or Z, or a pre-agreed value, and B2 is determined according to a processing capability reported by a terminal, and B2 is 0, 1 or 2.

In an embodiment, in a case where the third uplink transmission is a PUSCH for transmitting channel state information, the predefined duration is B1 or a sum of B1 and B2. Where B1 is a fourth set value, the fourth set value may be, such as, $T_{proc,2}$ in 3GPP TS38.214, or N2, or a pre-agreed value, and B2 is determined according to a processing capability reported by a terminal, and B2 is 0, 1 or 2.

In an embodiment, in a case where the third uplink transmission is a PUCCH for transmitting a BFR, the predefined duration is B1 or a sum of B1 and B2. Where B1 is a fifth set value, the fifth set value may be, such as, $T_v$ in 3GPP TS38.214, or N1, or a pre-agreed value, and B2 is determined according to a processing capability reported by a terminal, and B2 is 0, 1 or 2.

In an embodiment, in a case where the third uplink transmission is a dynamically scheduled PUSCH for transmitting uplink data, the predefined duration is B1 or a sum of B1 and B2. Where B1 is a sixth set value, the sixth set value may be, such as, $T_{proc,2}$ in 3GPP TS38.214, or N2, or a pre-agreed value, and B2 is determined according to a processing capability reported by a terminal, and B2 is 0, 1 or 2.

In an embodiment, in a case where the third uplink transmission is a semi-statically scheduled PUSCH for transmitting uplink data, the predefined duration is B1 or a sum of B1 and B2. Where B1 is a seventh set value, the seventh set value may be, such as, $T_{proc,2}$ in TS38.214, or N2, or a pre-agreed value, and B2 is determined according to a processing capability reported by a terminal, and B2 is 0, 1 or 2.

In an embodiment, in a case where the third uplink transmission is a transmission of SRS, the predefined duration is B1 or a sum of B1 and B2. Where B1 is an eighth set value, the eighth set value may be, such as, $T_{proc,2}$ in 3GPP TS38.214, or N2, or a pre-agreed value, and B2 is determined according to a processing capability reported by a terminal, and B2 is 0, 1 or 2.

In an embodiment, in a case where the third uplink transmission is a PUCCH for transmitting A-CSI, the predefined duration is B1 or a sum of B1 and B2, where B1 is a ninth set value, the ninth set value may be, such as, $T_{proc,CSI}$ in 3GPP TS38.214, or Z, or a pre-agreed value, and B2 is determined according to a processing capability reported by a terminal, and B2 is 0, 1 or 2.

In an embodiment, the predefined duration includes B1, or the predefined duration includes B1 and B2. B1 may be $T_{proc,1}$ in 3GPP TS38.214, or may be one of N, N1, $T_{proc,2}$, N2, Z, Z', $T_{proc,CSI}$, or N3, or may be a pre-agreed value. N, N1, N2, N3, Z, Z' is a symbol in units, is a value defined in 3GPP TS38.214 or 3GPP TS38.213. $T_{proc,1}$, $T_{proc,2}$, and $T_{proc,CSI}$ is an amount of time, which may be slightly adjusted according to the actual application, or $T_{proc,1}$, $T_{proc,2}$, and $T_{proc,CSI}$ may be a value defined in TS38.214 or TS38.213, and the symbol and the amount of time described above may be converted to each other. If B1 is $T_{proc,1}$, it is further possible to set $d_{1,1}=0$ in $T_{proc,1}$ If B1 is $T_{proc,2}$, 2, it is further possible to set $d_{2,1}=0$ in $T_{proc,2}$. B2 is one of 0, 1 or 2, is a symbol in units, and is determined according to the processing capacity reported by the UE. It should be noted that a duration determination manner of the predefined duration in this embodiment may also apply to a duration determination of the predefined duration in all embodiments described above.

In an embodiment, the set condition includes: the third uplink transmission corresponding to the second priority.

In this embodiment, whether the cancelled and non-overlapping time domain symbols in the first uplink transmission may be multiplexed is determined based on the priority of the traffic. For example, a serving node (e.g., a base station) and a communication node (e.g., a UE) agree that, for a same UE, non-overlapping time domain symbols are allowed to be used for a transmission of the third uplink transmission with the second priority in the cancelled uplink transmission with the first priority in a case where time domain resources of multiple uplink transmission channels overlap, or are forbidden to be used for a transmission of the third uplink transmission with the first priority, so that the third uplink transmission with the second priority cannot be delayed, and thus the reliability of the service with the second priority is ensured.

According to the uplink transmission method provided in the embodiments described above, the utilization rate of the resource and the efficiency of the uplink transmission are improved by multiplexing the time domain symbols of the cancelled uplink transmission, an effective solution is provided for uplink transmission and uplink transmission multiplexing in a case where time domains overlap, and thus the flexibility and reliability of the scheduling and transmission are improved.

An embodiment of the present application further provides an uplink transmission method, in a case where the uplink transmissions overlap in the time domain, a starting symbol of the cancelled uplink transmission is determined, whereby an effective solution is provided for the uplink transmission in a case of time domain overlapping, the flexibility and the reliability of the uplink transmission are improved, so that the base station can accurately receive an actually transmitted part, and the efficiency of the uplink transmission is improved.

Figure 6:
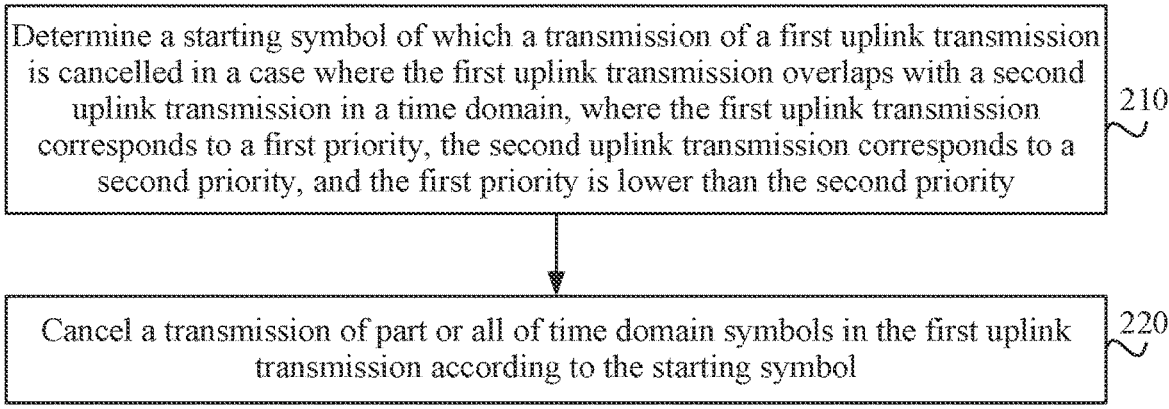
FIG. 6 is a flowchart of an uplink transmission method provided in another embodiment.

FIG. 6 is a flowchart of an uplink transmission method provided in another embodiment, as shown in FIG. 6, the method provided in this embodiment includes 210 and 220.

In 210, a starting symbol of which a transmission of a first uplink transmission is cancelled is determined in a case where the first uplink transmission overlaps with a second uplink transmission in a time domain, where the first uplink transmission corresponds to a first priority, the second uplink transmission corresponds to a second priority, and the first priority is lower than the second priority.

In 220, a transmission of part or all of time domain symbols in the first uplink transmission is cancelled according to the starting symbol.

In this embodiment, in a case where the first uplink transmission (first priority) overlaps with the second uplink transmission (second priority) in the time domain, a starting symbol of which a transmission of a first uplink transmission with the first priority is cancelled is firstly determined, whereby a transmission of part or all of time domain symbols in the first uplink transmission is cancelled, and thus the reliability of an uplink transmission with the second priority is ensured.

In an embodiment, the starting symbol of which the transmission of the first uplink transmission is cancelled may refer to a latest symbol to which the first uplink transmission is allowed, i.e., the starting symbol is allowed to be transmitted, and a transmission of time domain symbols following this starting symbol is cancelled; it may also refer to the first symbol which is cancelled from transmission, i.e., this starting symbol and the time domain symbol following this starting symbol are both cancelled from transmission. If the starting symbol is agreed to be contained in a symbol which is cancelled from transmission, all time domain symbols starting from this starting symbol are cancelled, and if the symbol is agreed not to be contained in the symbol which is cancelled from transmission, then the starting symbol is allowed to be transmitted. The starting symbol is used as a boundary symbol, which may be processed in a manner pre-agreed by the communication node or by a protocol.

In an embodiment, the starting symbol of which the transmission of the first uplink transmission is cancelled may refer to a latest symbol to which the first uplink transmission is allowed, and the first uplink transmission cannot continue to be transmitted afterwards, i.e., the remaining transmission needs to be cancelled if a transmission of the first uplink transmission is not finished afterwards. Or, the starting symbol of which the transmission of the first uplink transmission is cancelled may be a beginning symbol to which the first uplink transmission has to be transmitted (if an end position of the first uplink transmission is later than the beginning symbol). It should be noted that this starting symbol acts as a boundary symbol, which may be processed in a manner pre-agreed by the communication node or by the protocol, e.g., if it is agreed that this symbol is contained within a cancelled symbol, then the cancellation starts from this symbol, if it is agreed that this symbol is not contained within a cancelled symbol, then this symbol is allowed to be transmitted, followed by a cancelled symbol.

In an embodiment, the second uplink transmission includes: multiple dynamically scheduled second priority uplink transmissions, time domains among the multiple dynamically scheduled second priority uplink transmissions do not overlap, but the multiple dynamically scheduled second priority uplink transmissions overlap with the first uplink transmission in the time domain. The determining the starting symbol of which the transmission of the first uplink transmission is cancelled includes: determining the starting symbol of which the transmission of the first uplink transmission is cancelled according to the multiple dynamically scheduled second priority uplink transmissions.

In this embodiment, the second uplink transmission includes multiple dynamically scheduled second priority uplink transmissions, such as an uplink transmission 1, an uplink transmission 2 and an uplink transmission 3, which are not overlapped in the time domain but overlap with the first uplink transmission in the time domain, so that conflicts exist between the uplink transmissions. In this case, the starting symbol of which the transmission of the first uplink transmission is cancelled is determined according to the uplink transmission 1, the uplink transmission 2 and the uplink transmission 3.

In an embodiment, the starting symbol satisfies that: it is started from a predefined duration after an end symbol of downlink control information corresponding to a first dynamically scheduled second priority uplink transmission among the multiple dynamically scheduled second priority uplink transmissions; or it is started from an earliest predefined duration in a predefined duration after an end symbol of downlink control information corresponding to each dynamically scheduled second priority uplink transmission in the multiple dynamically scheduled second priority uplink transmissions.

For example, if the uplink transmission 1 in the second uplink transmission is a first (earliest) dynamically scheduled second priority uplink transmission, then the first uplink transmission starts at a predefined duration after (an end point of) an end symbol of DCI corresponding to the uplink transmission 1, and a transmission of the later time domain symbol is cancelled; or the predefined duration is determined according to each uplink transmission in each second uplink transmission, for example, a predefined duration after DCI corresponding to the uplink transmission 1 is recorded as $t_1$, a predefined duration after DCI corresponding to the uplink transmission 2 is recorded as $t_2$, a predefined duration after DCI corresponding to the uplink transmission 3 is recorded as $t_3$, where $t_1$ is earlier than $t_2$ and $t_3$, then a transmission of the first uplink transmission is cancelled from a time domain symbol after $t_1$.

In an embodiment, in a case where the second uplink transmission is a dynamically scheduled PUCCH for a transmission of HARQ-ACK with the second priority, the predefined duration may also be from after (an end point of) a PDSCH end symbol corresponding to the HARQ-ACK. The duration determination manner of the predefined duration is the same as the duration determination manner of a predefined duration when the second uplink transmission is a dynamically scheduled other second priority uplink transmission.

In an embodiment, each of the multiple dynamically scheduled second priority uplink transmissions includes: a PUCCH for transmitting HARQ-ACK with the second priority, a PUCCH for transmitting a scheduling request with the second priority, a PUSCH for transmitting channel state information with the second priority, a PUCCH for transmitting a BFR with the second priority, or a dynamically scheduled PUSCH for transmitting uplink data with the second priority, in some embodiments, the second uplink transmission may also include a PUCCH for transmitting an A-CSI with the second priority; and the first uplink transmission includes: a PUCCH for transmitting a HARQ-ACK with the first priority, a PUCCH for transmitting a scheduling request with the first priority, a PUCCH for transmitting P-SCI with the first priority, a PUSCH for transmitting CSI with the first priority, a PUCCH for transmitting a BFR with the first priority, a dynamically scheduled PUSCH for transmitting uplink data with the first priority, or a semi-statically scheduled PUSCH for transmitting uplink data with the first priority, in some embodiments, the first uplink transmission may also be a PUCCH for transmitting an SRS with the first priority or a PUCCH for transmitting an A-CSI with the first priority.

In the embodiment, the predefined duration is determined according to types of the second uplink transmission, and the corresponding predefined duration may be different when the type of the second uplink transmission is different.

In an embodiment, the second uplink transmission includes multiple semi-statically scheduled second priority uplink transmissions, the multiple semi-statically scheduled second priority uplink transmissions are not overlapped in time domain, and multiple semi-statically scheduled second priority uplink transmissions overlap with the first uplink transmission in the time domain. The determining the starting symbol of cancelled transmission of the first uplink transmission includes: determining the starting symbol of cancelled transmission of the first uplink transmission according to the multiple semi-statically scheduled second priority uplink transmissions.

In this embodiment, the second uplink transmission includes multiple semi-statically scheduled second priority uplink transmissions, such as an uplink transmission a, an uplink transmission b and an uplink transmission c, which are not overlapped in the time domain but overlap with the first uplink transmission in the time domain, so that conflicts exist between the uplink transmissions. In this case, the starting symbol of which the transmission of the first uplink transmission is cancelled is determined according to the uplink transmission a, the uplink transmission b and the uplink transmission c.

In an embodiment, the starting symbol satisfies that: it is started from a predefined duration before a starting symbol of a first semi-statically scheduled second priority uplink transmission; or it is started from an earliest predefined duration in a predefined duration before a starting symbol corresponding to each semi-statically scheduled second priority uplink transmission in the multiple semi-statically scheduled second priority uplink transmissions.

In this embodiment, the starting symbol (latest) of which the transmission of the first uplink transmission is cancelled starts from a symbol corresponding to the predefined duration before (the starting point of) the starting symbol of the first semi-statically scheduled second priority uplink transmission, or starts from (latest) the predefined duration before (the starting point of) the starting symbol of the first semi-statically scheduled second priority uplink transmission. For example, if the uplink transmission a in the second uplink transmission is a first (earliest) semi-statically scheduled second priority uplink transmission, then the first uplink transmission starts from a predefined duration before (the starting point of) the starting symbol of the uplink transmission a, and a transmission of the later time domain symbol is cancelled; or the predefined duration is determined according to each uplink transmission in each second uplink transmission, for example, a predefined duration before (the starting point of) the starting symbol of the uplink transmission a is recorded as $t_a$, a predefined duration before (the starting point of) the starting symbol of the uplink transmission b is recorded as $t_b$, and a predefined duration before (the starting point of) the starting symbol of the uplink transmission c is recorded as $t_c$, where $t_a$ is earlier than $t_b$ and $t_c$, then a transmission of the first uplink transmission is cancelled from a time domain symbol after $t_a$.

In an embodiment, the semi-statically scheduled second priority uplink transmission includes: a PUCCH for transmitting a HARQ-ACK with the second priority, a PUCCH for transmitting a scheduling request with the second priority, a PUSCH for transmitting channel state information with the second priority, a PUCCH for transmitting a BFR with the second priority, or a semi-statically scheduled PUSCH for transmitting uplink data with the second priority, in some embodiments, the second uplink transmission may also include a PUCCH for transmitting an A-CSI with the second priority; and the first uplink transmission includes: a PUCCH for transmitting HARQ-ACK with the first priority, a PUCCH for transmitting a scheduling request with the first priority, a PUCCH for transmitting P-CSI with the first priority, a PUSCH for transmitting CSI with the first priority, a PUCCH for transmitting a BFR with the first priority, a dynamically scheduled PUSCH for transmitting uplink data with the first priority, or a semi-statically scheduled PUSCH for transmitting uplink data with the first priority, in some embodiments, the first uplink transmission may also include a PUCCH for transmitting an SRS with the first priority or a PUCCH for transmitting an A-CSI with the first priority.

In this embodiment, the predefined duration is determined according to types of the second uplink transmission, and types of the second uplink transmission are different, and the corresponding predefined durations may also be different.

In an embodiment, the second uplink transmission includes at least one dynamically scheduled second priority uplink transmission and at least one semi-statically scheduled second priority uplink transmission; time domains between the at least one dynamically scheduled second priority uplink transmission and the at least one semi-statically scheduled second priority uplink transmission do not overlap; and the at least one dynamically scheduled second priority uplink transmission and the at least one semi-statically scheduled second priority uplink transmission overlap with the first uplink transmission in the time domain.

In this embodiment, the second uplink transmission includes a semi-statically scheduled second priority uplink transmissions, such as an uplink transmission 1 and an uplink transmission 2, and also includes a dynamically scheduled second priority uplink transmission, such as an uplink transmission a, which are not overlapped in the time domain but overlap with the first uplink transmission in the time domain, so that conflicts exist between the uplink transmissions, in this case, the starting symbol of which the transmission of the first uplink transmission is cancelled is determined according to the uplink transmission 1, the uplink transmission 2 and the uplink transmission a.

In an embodiment, determining the starting symbol of which the transmission of the first uplink transmission is cancelled includes: determining a first starting symbol of which the transmission of the first uplink transmission is cancelled according to a first dynamically scheduled second priority uplink transmission in the second uplink transmission; determining a second starting symbol of which the transmission of the first uplink transmission is cancelled according to a first semi-statically scheduled second priority uplink transmission in the second uplink transmission; and using an earliest symbol in the first starting symbol and the second starting symbol as the starting symbol of which the transmission of the first uplink transmission is cancelled.

In this embodiment, the determining the first starting symbol according to the dynamically scheduled second priority uplink transmission in the second uplink transmission may specifically be that the first starting symbol is determined according to the first dynamically scheduled second priority uplink transmission, and the determination method may be referred to the above embodiments. The determining the second starting symbol is determined according to the semi-statically scheduled second priority uplink transmission in the second uplink transmission may specifically be that second starting symbol is determined according to the first semi-statically scheduled second priority uplink transmission, and the determination method may be referred to the above embodiments. Assuming that the first starting symbol is $M_1$ and the second starting symbol is $M_2$, an earlier symbol in both $M_1$ and $M_2$ is used as the starting symbol of which the transmission of the first uplink transmission is cancelled.

In an embodiment, determining the starting symbol of which the transmission of the first uplink transmission is cancelled includes: determining a third starting symbol of which the transmission of the first uplink transmission is cancelled according to each dynamically scheduled second priority uplink transmission in the second uplink transmission; determining a fourth starting symbol of which the transmission of the first uplink transmission is cancelled according to each semi-statically scheduled second priority uplink transmission in the second uplink transmission; and using an earliest symbol in the third starting symbol and the fourth starting symbol as the starting symbol of which the transmission of the first uplink transmission is cancelled.

In this embodiment, the determining the third starting symbol according to the dynamically scheduled second priority uplink transmission in the second uplink transmission may specifically be that the third starting symbol determined according to each dynamically scheduled second priority uplink transmission, and the determination method may be referred to the above embodiments. The determining the fourth starting symbol according to the semi-statically scheduled second priority uplink transmission in the second uplink transmission may specifically be that the fourth starting symbol is determined according to each semi-statically scheduled second priority uplink transmission, and the determination method may be referred to the above embodiments. Assuming that the first starting symbol is $M_3$ and the second starting symbol is $M_4$, then an earlier symbol in both $M_3$ and $M_4$ is used as the starting symbol of which the transmission of the first uplink transmission is cancelled.

In an embodiment, the predefined duration is determined according to a type of the second uplink transmission.

In an embodiment, in a case where the second uplink transmission is a PUCCH for transmitting a HARQ-ACK, the predefined duration is B1 or a sum of B1 and B2. Where B1 is a first set value, the first set value may be, such as, $T_{proc,1}$ in 3GPP TS38.214, or N1, or a pre-agreed value, and B2 is determined according to a processing capability reported by a terminal, and B2 is 0, 1 or 2.

In an embodiment, in a case where the second uplink transmission is a PUCCH for transmitting a scheduling request, the predefined duration is B1 or a sum of B1 and B2. Where B1 is a second set value, the second set value may be, such as, $T_{proc,1}$ in 3GPP TS38.214, or N1, or a pre-agreed value, and B2 is determined according to a processing capability reported by a terminal, and B2 is 0, 1 or 2.

In an embodiment, in a case where the second uplink transmission is a PUCCH for transmitting channel state information, the predefined duration is B1 or a sum of B1 and B2. Where B1 is a third set value, the third set value may be, such as, $T_{proc,CSI}$ in 3GPP TS38.214, or Z, or a pre-agreed value, and B2 is determined according to a processing capability reported by a terminal, and B2 is 0, 1 or 2.

In an embodiment, in a case where the second uplink transmission is a PUSCH for transmitting channel state information, the predefined duration is B1 or a sum of B1 and B2. Where B1 is a fourth set value, the fourth set value may be, such as, $T_{proc,2}$ in 3GPP TS38.214, or N2, or a pre-agreed value, and B2 is determined according to a processing capability reported by a terminal, and B2 is 0, 1 or 2.

In an embodiment, in a case where the second uplink transmission is a PUCCH for transmitting a BFR, the predefined duration is B1 or a sum of B1 and B2. Where B1 is a fifth set value, the fifth set value may be, such as, $T_{proc,1}$ in 3GPP TS38.214, or N1, or a pre-agreed value, and B2 is determined according to a processing capability reported by a terminal, and B2 is 0, 1 or 2.

In an embodiment, in a case where the second uplink transmission is a dynamically scheduled PUSCH for transmitting uplink data, the predefined duration is B1 or a sum of B1 and B2. Where B1 is a sixth set value, the sixth set value may be, such as, $T_{proc,2}$ in 3GPP TS38.214, or N2, or a pre-agreed value, and B2 is determined according to a processing capability reported by a terminal, and B2 is 0, 1 or 2.

In an embodiment, in a case where the second uplink transmission is a semi-statically scheduled PUSCH for transmitting uplink data, the predefined duration is B1 or a sum of B1 and B2. Where B1 is a seventh set value, the seventh set value may be, such as, $T_{proc,2}$ in 3GPP TS38.214, or N2, or a pre-agreed value, and B2 is determined according to a processing capability reported by a terminal, and B2 is 0, 1 or 2.

In an embodiment, in a case where the second uplink transmission is a transmission of SRS, the predefined duration is B1 or a sum of B1 and B2. Where B1 is an eighth set value, the eighth set value may be, such as, $T_{proc,2}$ in 3GPPTS38.214, or N2, or a pre-agreed value, and B2 is determined according to a processing capability reported by a terminal, and B2 is 0, 1 or 2.

In an embodiment, in a case where the second uplink transmission is a PUCCH for transmitting A-CSI, the predefined duration is B1 or a sum of B1 and B2, where B1 is a ninth set value, the ninth set value may be, such as, $T_{proc,CSI}$ in TS38.214, or Z, or a pre-agreed value, and B2 is determined according to a processing capability reported by a terminal, and B2 is 0, 1 or 2.

In an embodiment, the predefined duration includes B1, or the predefined duration includes B1 and B2. B1 may be $T_{proc,1}$ in 3GPP TS38.214, or may be one of N, N1, $T_{proc,2}$, N2, Z, Z', $T_{proc,CSI}$, or N3, or may be a pre-agreed value. N, N1, N2, N3, Z, Z' is a symbol in units, is a value defined in 3GPP TS38.214 or 3GPP TS38.213. $T_{proc,1}$, $T_{proc,2}$, and $T_{proc,CSI}$ is an amount of time, which may be slightly adjusted according to the actual application, or $T_{proc,1}$, $T_{proc,2}$, and $T_{proc,CSI}$ may be a value defined in TS38.214 or TS38.213, and the symbol and the amount of time described above may be converted to each other. If B1 is $T_{proc,1}$, it is further possible to set $d_{1,1}=0$ in $T_{proc,1}$. If B1 is $T_{proc,2}$, 2, it is further possible to set $d_{2,1}=0$ in $T_{proc,2}$. B2 is one of 0, 1 or 2, is a symbol in units, and is determined according to the processing capacity reported by the UE. It should be noted that a duration determination manner of the predefined duration in this embodiment may also apply to a duration determination of the predefined duration in all embodiments described above.

In the above embodiments, in a case where multiple second priority uplink transmissions with non-overlapping time domains overlap with one first priority uplink transmission at the same time in the time domain, a starting symbol of which the first priority uplink transmission is cancelled is determined, and a starting symbol is determined for the dynamic scheduling and the semi-static scheduling, whereby an effective solution is provided for the uplink transmission in a case of time domain overlapping, the flexibility and the reliability of the uplink transmission are improved, so that the base station can accurately receive an actually transmitted part, and the efficiency of the uplink transmission is improved.

Figure 7:
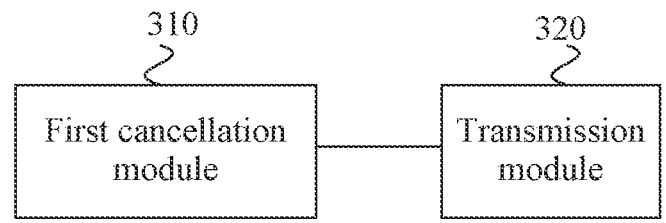
FIG. 7 is a schematic structural diagram of an uplink transmission device provided in an embodiment.

An embodiment of the present application further provides an uplink transmission device. FIG. 7 is a schematic structural diagram of an uplink transmission device provided in an embodiment. As shown in FIG. 7, the uplink transmission device includes a first cancellation module 310 and a transmission module 320.

The first cancellation module 310 is configured to cancel a transmission of part or all of time domain symbols in a first uplink transmission in a case where the first uplink transmission overlaps with a second uplink transmission in a time domain, where the first uplink transmission corresponds to a first priority, the second uplink transmission corresponds to a second priority, and the first priority is lower than the second priority.

The transmission module 320 is configured to transmit a third uplink transmission through time domain symbols of which the transmission is cancelled in the first uplink transmission in a case where a set condition is satisfied.

According to the uplink transmission device in this embodiment, in a case of two uplink transmissions overlapping in a time domain, an uplink transmission with a first priority is cancelled, and the cancelled time domain symbol may be multiplexed for a third uplink transmission, so that the utilization rate of resources and the flexibility of the scheduling are improved, the efficiency of the uplink transmission is improved, and thus the reliability of the uplink transmission is improved.

In an embodiment, the third uplink transmission corresponds to the first priority, and a scheduling type of the third uplink transmission is a semi-static scheduling; and the set condition includes: a predefined duration before a starting symbol of the third uplink transmission being later than a starting symbol or an end symbol of downlink control information corresponding to the second uplink transmission.

In an embodiment, the third uplink transmission corresponds to the first priority, and a scheduling type of the third uplink transmission is a dynamic scheduling; and the set condition includes: a starting symbol of the third uplink transmission being later than a predefined duration after an end symbol of downlink control information corresponding to the third uplink transmission; a starting symbol of the downlink control information corresponding to the third uplink transmission is later than a starting symbol of downlink control information corresponding to the second uplink transmission, or the end symbol of the downlink control information corresponding to the third uplink transmission is later than an end symbol of downlink control information corresponding to the second uplink transmission.

In an embodiment, the third uplink transmission corresponds to the second priority, and a scheduling type of the third uplink transmission is a semi-static scheduling; and the set condition includes: a predefined duration before a starting symbol of the third uplink transmission being later than a starting symbol or an end symbol of downlink control information corresponding to the second uplink transmission.

In an embodiment, the third uplink transmission corresponds to the second priority, and a scheduling type of the third uplink transmission is a dynamic scheduling; and the set condition includes: a starting symbol of the third uplink transmission being later than a predefined duration after an end symbol of downlink control information corresponding to the third uplink transmission; a starting symbol of the downlink control information corresponding to the third uplink transmission being later than a starting symbol of downlink control information corresponding to the second uplink transmission, or the end symbol of the downlink control information corresponding to the third uplink transmission being later than an end symbol of downlink control information corresponding to the second uplink transmission; where the third uplink transmission does not overlap with the second uplink transmission in the time domain.

In an embodiment, the third uplink transmission corresponds to the second priority; and a transmission sequence of the third uplink transmission and the second uplink transmission is consistent with a scheduling sequence of the third uplink transmission and the second uplink transmission.

In an embodiment, the first uplink transmission or the third uplink transmission includes: a PUCCH for transmitting HARQ-ACK with the first priority, a PUCCH for transmitting a scheduling request with the first priority, a PUCCH for transmitting P-CSI with the first priority, a PUSCH for transmitting channel state information with the first priority, a PUCCH for transmitting a SRS with the first priority, a PUCCH for transmitting a BFR with the first priority, a dynamically scheduled PUSCH for transmitting uplink data with the first priority, or a semi-statically scheduled PUSCH for transmitting uplink data with the first priority, or a PUCCH for transmitting A-CSI with the first priority. The second uplink transmission includes: a PUCCH for transmitting a HARQ-ACK with the second priority, a PUCCH for transmitting a scheduling request with the second priority, a PUSCH for transmitting channel state information with the second priority, a PUCCH for transmitting a BFR with the second priority, a dynamically scheduled PUSCH for transmitting uplink data with the second priority, a semi-statically scheduled PUSCH for transmitting uplink data with the second priority, or a PUCCH for transmitting A-CSI with the second priority.

In an embodiment, the first uplink transmission includes: a PUCCH for transmitting an HARQ-ACK with the first priority, a PUCCH for transmitting a scheduling request with the first priority, a PUCCH for transmitting P-CSI with the first priority, a PUSCH for transmitting channel state information with the first priority, a PUCCH for transmitting an SRS with the first priority, a PUCCH for transmitting a BFR with the first priority, a dynamically scheduled PUSCH for transmitting uplink data with the first priority, a semi-statically scheduled PUSCH for transmitting uplink data with the first priority, or a PUCCH for transmitting A-CSI with the first priority. The second uplink transmission or the third uplink transmission includes: a PUCCH for transmitting a HARQ-ACK with the second priority, a PUCCH for transmitting a scheduling request with the second priority, a PUSCH for transmitting channel state information with the second priority, a PUCCH for transmitting a BFR with the second priority, a dynamically scheduled PUSCH for transmitting uplink data with the second priority, a semi-statically scheduled PUSCH for transmitting uplink data with the second priority, or a PUCCH for transmitting A-CSI with the second priority.

In an embodiment, in a case where the third uplink transmission is a PUCCH for transmitting a HARQ-ACK, the predefined duration is B1 or a sum of B1 and B2. Where B1 is a first set value, and B2 is determined according to a processing capability reported by a terminal.

In an embodiment, in a case where the third uplink transmission is a PUCCH for transmitting a scheduling request, the predefined duration is B1 or a sum of B1 and B2. Where B1 is a second set value, and B2 is determined according to a processing capability reported by a terminal.

In an embodiment, in a case where the third uplink transmission is a PUCCH for transmitting channel state information, the predefined duration is B1 or a sum of B1 and B2. Where B1 is a third set value, and B2 is determined according to a processing capability reported by a terminal.

In an embodiment, in a case where the third uplink transmission is a PUSCH for transmitting channel state information, the predefined duration is B1 or a sum of B1 and B2. Where B1 is a fourth set value, and B2 is determined according to a processing capability reported by a terminal.

In an embodiment, in a case where the third uplink transmission is a PUCCH for transmitting a BFR, the predefined duration is B1 or a sum of B1 and B2. Where B1 is a fifth set value, and B2 is determined according to a processing capability reported by a terminal.

In an embodiment, in a case where the third uplink transmission is a dynamically scheduled PUSCH for transmitting uplink data, the predefined duration is B1 or a sum of B1 and B2. Where B1 is a sixth set value, and B2 is determined according to a processing capability reported by a terminal.

In an embodiment, in a case where the third uplink transmission is a semi-statically scheduled PUSCH for transmitting uplink data, the predefined duration is B1 or a sum of B1 and B2. Where B1 is a seventh set value, and B2 is determined according to a processing capability reported by a terminal.

In an embodiment, the set condition includes: the third uplink transmission corresponding to the second priority.

The uplink transmission device provided in this embodiment may refer to the uplink transmission method provided in the above embodiment, and the technical details that are not described in detail in this embodiment may refer to any of the above embodiments, and this embodiment has the same beneficial effects as the transmission method performed.

An embodiment of the present application further provides an uplink transmission device. In a case where the uplink transmissions overlap in the time domain, a starting symbol of the cancelled uplink transmission is determined, whereby an effective solution is provided for the uplink transmission in a case of time domain overlapping, the flexibility and the reliability of the uplink transmission are improved, so that the base station can accurately receive an actually transmitted part, and the efficiency of the uplink transmission is improved.

Figure 8:
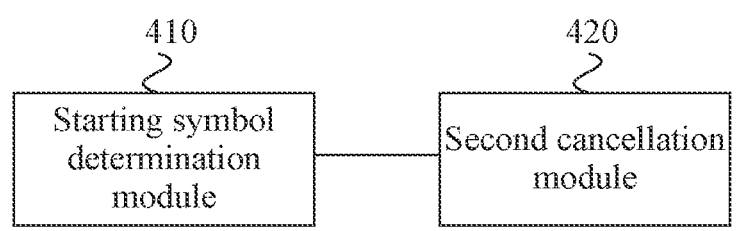
FIG. 8 is a schematic structural diagram of an uplink transmission device provided in another embodiment.

FIG. 8 is a schematic structural diagram of an uplink transmission device provided in another embodiment. As shown in FIG. 8, the transmission device includes a starting symbol determination module 410 and a second cancellation module 420.

The starting symbol determination module 410 is configured to determine a starting symbol of which a transmission of a first uplink transmission is cancelled in a case where the first uplink transmission overlaps with a second uplink transmission in a time domain. Where the first uplink transmission corresponds to a first priority, the second uplink transmission corresponds to a second priority, and the first priority is lower than the second priority.

The second cancellation module 420 is configured to cancel a transmission of part or all of time domain symbols in the first uplink transmission according to the starting symbol.

In an embodiment, the second uplink transmission includes multiple dynamically scheduled second priority uplink transmissions, time domains among the multiple dynamically scheduled second priority uplink transmissions do not overlap, and the multiple dynamically scheduled second priority uplink transmissions overlap with the first uplink transmission in the time domain.

The starting symbol determination module 410 is specifically configured to determine the starting symbol of which the transmission of the first uplink transmission is cancelled according to the multiple dynamically scheduled second priority uplink transmissions.

In an embodiment, the starting symbol satisfies that: it is started from a predefined duration after an end symbol of downlink control information corresponding to a first dynamically scheduled second priority uplink transmission among the multiple dynamically scheduled second priority uplink transmissions; or it is started from an earliest predefined duration in a predefined duration after an end symbol of downlink control information corresponding to each dynamically scheduled second priority uplink transmission in the multiple dynamically scheduled second priority uplink transmissions.

In an embodiment, each of the multiple dynamically scheduled second priority uplink transmissions includes: a PUCCH for transmitting HARQ-ACK with the second priority, a PUCCH for transmitting a scheduling request with the second priority, a PUSCH for transmitting channel state information with the second priority, a PUCCH for transmitting a BFR with the second priority, a dynamically scheduled PUSCH for transmitting uplink data with the second priority, or a PUCCH for transmitting A-CSI with the second priority. The first uplink transmission includes: a PUCCH for transmitting a HARQ-ACK with the first priority, a PUCCH for transmitting a scheduling request with the first priority, a PUCCH for transmitting P-CSI with the first priority, a PUSCH for transmitting channel state information with the first priority, a PUCCH for transmitting an SRS with the first priority, a PUCCH for transmitting a BFR with the first priority, a dynamically scheduled PUSCH for transmitting uplink data with the first priority, a semi-statically scheduled PUSCH for transmitting uplink data with the first priority, or a PUCCH for transmitting A-CSI with the first priority.

In an embodiment, the second uplink transmission includes multiple semi-statically scheduled second priority uplink transmissions, the multiple semi-statically scheduled second priority uplink transmissions do not overlap in the time domain, and the multiple semi-statically scheduled second priority uplink transmissions overlap with the first uplink transmission in the time domain.

The starting symbol determination module 410 is specifically configured to determine the starting symbol of which the transmission of the first uplink transmission is cancelled according to the multiple semi-statically scheduled second priority uplink transmissions.

In an embodiment, the starting symbol satisfies that: it is started from a predefined duration before a starting symbol of a first semi-statically scheduled second priority uplink transmission; or it is started from an earliest predefined duration in a predefined duration before a starting symbol corresponding to each semi-statically scheduled second priority uplink transmission in the multiple semi-statically scheduled second priority uplink transmissions.

In an embodiment, the semi-statically scheduled second priority uplink transmission includes: a PUCCH for transmitting a HARQ-ACK with the second priority, a PUCCH for transmitting a scheduling request with the second priority, a PUSCH for transmitting channel state information with the second priority, a PUCCH for transmitting a BFR with the second priority, a semi-statically scheduled PUSCH for transmitting uplink data with the second priority, or a PUCCH for transmitting A-CSI with the second priority. The first uplink transmission includes: a PUCCH for transmitting HARQ-ACK with the first priority, a PUCCH for transmitting a scheduling request with the first priority, a PUCCH for transmitting P-CSI with the first priority, a PUSCH for transmitting channel state information with the first priority, a PUCCH for transmitting an SRS with the first priority, a PUCCH for transmitting a BFR with the first priority, a dynamically scheduled PUSCH for transmitting uplink data with the first priority, a semi-statically scheduled PUSCH for transmitting uplink data with the first priority, or a PUCCH for transmitting A-CSI with the first priority.

In an embodiment, the second uplink transmission includes at least one dynamically scheduled second priority uplink transmission and at least one semi-statically scheduled second priority uplink transmission, time domains between the at least one dynamically scheduled second priority uplink transmission and the at least one semi-statically scheduled second priority uplink transmission do not overlap, and the at least one dynamically scheduled second priority uplink transmission and the at least one semi-statically scheduled second priority uplink transmission overlap with the first uplink transmission in the time domain.

In an embodiment, the starting symbol determination module 410 is specifically configured to: determine a first starting symbol of which the transmission of the first uplink transmission is cancelled according to a first dynamically scheduled second priority uplink transmission in the second uplink transmission; determine a second starting symbol of which the transmission of the first uplink transmission is cancelled according to a first semi-statically scheduled second priority uplink transmission in the second uplink transmission; and use an earliest symbol in the first starting symbol and the second starting symbol as the starting symbol of which the transmission of the first uplink transmission is cancelled.

In an embodiment, the starting symbol determination module 410 is specifically configured to: determine a third starting symbol of which the transmission of the first uplink transmission is cancelled according to each dynamically scheduled second priority uplink transmission in the second uplink transmission; determine a fourth starting symbol of which the transmission of the first uplink transmission is cancelled according to each semi-statically scheduled second priority uplink transmission in the second uplink transmission; and use an earliest symbol in the third starting symbol and the fourth starting symbol as the starting symbol of which the transmission of the first uplink transmission is cancelled.

In an embodiment, in a case where the second uplink transmission is a PUCCH for transmitting a HARQ-ACK, the predefined duration is B1 or a sum of B1 and B2. Where B1 is a first set value, and B2 is determined according to a processing capability reported by a terminal.

In an embodiment, in a case where the second uplink transmission is a PUCCH for transmitting a scheduling request, the predefined duration is B1 or a sum of B1 and B2. Where B1 is a second set value, and B2 is determined according to a processing capability reported by a terminal.

In an embodiment, in a case where the second uplink transmission is a PUCCH for transmitting channel state information, the predefined duration is B1 or a sum of B1 and B2. Where B1 is a third set value, and B2 is determined according to a processing capability reported by a terminal.

In an embodiment, in a case where the second uplink transmission is a PUSCH for transmitting channel state information, the predefined duration is B1 or a sum of B1 and B2. Where B1 is a fourth set value, and B2 is determined according to a processing capability reported by a terminal.

In an embodiment, in a case where the second uplink transmission is a PUCCH for transmitting a BFR, the predefined duration is B1 or a sum of B1 and B2. Where B1 is a fifth set value, and B2 is determined according to a processing capability reported by a terminal.

In an embodiment, in a case where the second uplink transmission is a dynamically scheduled PUSCH for transmitting uplink data, the predefined duration is B1 or a sum of B1 and B2. Where B1 is a sixth set value, and B2 is determined according to a processing capability reported by a terminal.

In an embodiment, in a case where the second uplink transmission is a semi-statically scheduled PUSCH for transmitting uplink data, the predefined duration is B1 or a sum of B1 and B2. Where B1 is a seventh set value, and B2 is determined according to a processing capability reported by a terminal.

According to the uplink transmission device in this embodiment, in a case where the uplink transmissions overlap in the time domain, a starting symbol of the cancelled uplink transmission is determined, whereby an effective solution is provided for the uplink transmission in a case of time domain overlapping, the flexibility and the reliability of the uplink transmission are improved, so that the base station can accurately receive an actually transmitted part, and the efficiency of the uplink transmission is improved.

Figure 9:
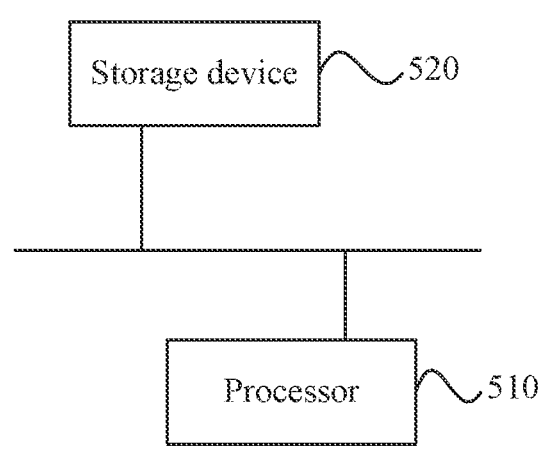
FIG. 9 is a schematic structural diagram of a hardware of a communication node provided in an embodiment.

An embodiment of the present application further provides a communication node. The uplink transmission method in the foregoing embodiment may be executed by the uplink transmission device, and the uplink transmission device may be implemented by software and/or hardware and integrated in the communication node. FIG. 9 is a schematic structural diagram of a hardware of a communication node provided in an embodiment. As shown in FIG. 9, a communication node provided in this embodiment includes a processor 510 and a storage device 520. The processor 510 in this communication node may be one or more, one processor 510 is used as an example in FIG. 9, the processor 510 and the storage device 520 in the apparatus may be connected by a bus or by other means, and an example in which the processor 510 and the storage device 520 in the apparatus may be connected by a bus is used in FIG. 9.

One or more programs, when executed by the one or more processors 510, cause the one or more processors 510 to implement the uplink transmission method of any one of the embodiments described above.

The storage device 520 in the communication node serves as a computer readable storage medium and may be used for storing one or more programs, and the programs may be software programs, computer executable programs and modules, such as a program instruction/module corresponding to the uplink transmission method in the embodiments of the present disclosure (e.g., a module in the uplink transmission device as shown in FIG. 7, including the first cancellation module 310 and the transmission module 320). The processor 510 executes various functional applications and data processing of the communication node by running software programs, instructions, and modules stored in the storage device 520, so that the uplink transmission method in the method embodiments described above is implemented.

The storage device 520 mainly includes a storage program region and a storage data region, where the storage program region may store an operating system, an application program required for at least one function; the storage data region may store data or the like created according to the use of the apparatus (such as, a third uplink transmission, a setting condition in the above embodiments). Moreover, the storage device 520 may include a high-speed random access memory and may also include a non-volatile memory, such as at least one magnetic disk storage device, a flash memory device, or other non-volatile solid-state memory device. In some instances, the storage device 520 may further include a memory disposed remotely with respect to the processor 510, the remote memory may be connected to the communication node over a network. Instances of such networks include, but are not limited to, the Internet, an intranet, a local area network, a mobile communication network, and combinations thereof.

Moreover, when the one or more programs included in the above-described communication node are executed by the one or more processors 510, the following operations are implemented: a transmission of part or all of time domain symbols in a first uplink transmission is cancelled in a case where the first uplink transmission overlaps with a second uplink transmission in a time domain, where the first uplink transmission corresponds to a first priority, the second uplink transmission corresponds to a second priority, and the first priority is lower than the second priority; and a third uplink transmission is transmitted through time domain symbols of which the transmission is cancelled in the first uplink transmission in a case where a set condition is satisfied.

Or, when the one or more programs included in the above-described communication node are executed by the one or more processors 510, the following operations are implemented: a starting symbol of which a transmission of a first uplink transmission is cancelled is determined in a case where the first uplink transmission overlaps with a second uplink transmission in a time domain, where the first uplink transmission corresponds to a first priority, the second uplink transmission corresponds to a second priority, and the first priority is lower than the second priority; and a transmission of part or all of time domain symbols in the first uplink transmission is cancelled according to the starting symbol.

The communication node proposed in this embodiment may refer to the uplink transmission method proposed in the above embodiments, technical details not described in detail in this embodiment may refer to any of the above embodiments, and this embodiment has the same beneficial effects as the uplink transmission method performed.

An embodiment of the present application further provides a storage medium containing a computer executable instruction, and the computer executable instruction, when executed by a computer processor, is used for performing the uplink transmission method described above.

Those skilled in the art will appreciate from the above description of the implementation manners that the present application may be implemented by means of software and general purpose hardware, and may also be implemented by hardware. Based on this understanding, the technical scheme of the present application may be embodied in the form of a software product, and the computer software product may be stored in a computer readable storage medium, such as a floppy disk of a computer, a read-only memory (ROM), a random access memory (RAM), a flash memory (FLASH), a hard disk or an optional disk, including multiple instructions to enable a computer device (which may be a personal computer, a server, or a network device, etc.) to perform the method described in any of the embodiments of the present application.

The above description is only an exemplary embodiment of the present application, and is not intended to limit the scope of protection of the present application.

Any block diagram of the logic flow in the accompanying drawings of the present application may represent program steps, or may represent interconnected logic circuits, modules, and functions, or may represent a combination of program steps and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), etc. Computer readable media may include non-instantaneous storage media. Data processors may be of any type suitable for the local technical environment, such as, but not limited to, general-purpose computers, specialized computers, microprocessors, digital signal processors (DSP), application specific integrated circuits (ASIC), field-programmable gate array (FPGA)), and processors based on multi-core processor architectures.

What is claimed is:

1. An uplink transmission method, comprising:
    canceling a transmission of part or all of time domain symbols in a first uplink transmission according to a starting symbol of which the transmission of the first uplink transmission is cancelled in a case where the first uplink transmission overlaps with a second uplink transmission in a time domain, wherein the first uplink transmission corresponds to a first priority, the second uplink transmission corresponds to a second priority, and the first priority is lower than the second priority; and
    transmitting a third uplink transmission through time domain symbols of which the transmission is cancelled in the first uplink transmission in a case where a set condition is satisfied;
    wherein the starting symbol of which the transmission of the first uplink transmission is cancelled is determined according to a predefined duration, the predefined duration is determined according to types of the second uplink transmission or the third uplink transmission;
    wherein the third uplink transmission corresponds to the first priority, and a scheduling type of the third uplink transmission is a semi-static scheduling; and
    wherein the set condition comprises:
    the predefined duration before a starting symbol of the third uplink transmission being later than a starting symbol or an end symbol of downlink control information corresponding to the second uplink transmission;
    wherein the first uplink transmission or the third uplink transmission comprises: a physical uplink control channel (PUCCH) for transmitting hybrid automatic repeat request-acknowledgement (HARQ-ACK) information with the first priority, a PUCCH for transmitting a scheduling request with the first priority, a PUCCH for transmitting periodic-channel state information with the first priority, a physical uplink shared channel (PUSCH) for transmitting channel state information with the first priority, a PUCCH for transmitting a beam failure recovery (BFR) with the first priority, a dynamically scheduled PUSCH for transmitting uplink data with the first priority, or a semi-statically scheduled PUSCH for transmitting uplink data with the first priority; and
    wherein the second uplink transmission comprises: a PUCCH for transmitting a HARQ-ACK with the second priority, a PUCCH for transmitting a scheduling request with the second priority, a PUSCH for transmitting channel state information with the second priority, a PUCCH for transmitting a BFR with the second priority, a dynamically scheduled PUSCH for transmitting uplink data with the second priority, or a semi-statically scheduled PUSCH for transmitting uplink data with the second priority.

2. The method of claim 1, wherein the third uplink transmission corresponds to the first priority, and a scheduling type of the third uplink transmission is a dynamic scheduling; and
    wherein the set condition comprises:
    a starting symbol of the third uplink transmission being later than the predefined duration after an end symbol of downlink control information corresponding to the third uplink transmission;
    a starting symbol of the downlink control information corresponding to the third uplink transmission being later than a starting symbol of downlink control information corresponding to the second uplink transmission, or the end symbol of the downlink control information corresponding to the third uplink transmission being later than an end symbol of downlink control information corresponding to the second uplink transmission.

3. The method of claim 1, wherein the third uplink transmission corresponds to the second priority, and a scheduling type of the third uplink transmission is a semi-static scheduling; and
    wherein the set condition comprises:
    the predefined duration before a starting symbol of the third uplink transmission being later than a starting symbol or an end symbol of downlink control information corresponding to the second uplink transmission.

4. The method of claim 3, wherein the first uplink transmission comprises: a PUCCH for transmitting an HARQ-ACK with the first priority, a PUCCH for transmitting a scheduling request with the first priority, a PUCCH for transmitting periodic-channel state information with the first priority, a PUSCH for transmitting channel state information with the first priority, a PUCCH for transmitting a BFR with the first priority, a dynamically scheduled PUSCH for transmitting uplink data with the first priority, or a semi-statically scheduled PUSCH for transmitting uplink data with the first priority; and wherein the second uplink transmission or the third uplink transmission comprises: a PUCCH for transmitting a HARQ-ACK with the second priority, a PUCCH for transmitting a scheduling request with the second priority, a PUSCH for transmitting channel state information with the second priority, a PUCCH for transmitting a BFR with the second priority, a dynamically scheduled PUSCH for transmitting uplink data with the second priority, or a semi-statically scheduled PUSCH for transmitting uplink data with the second priority.

5. The method of claim 1, wherein the third uplink transmission corresponds to the second priority, and a scheduling type of the third uplink transmission is a dynamic scheduling; and wherein the set condition comprises:
a starting symbol of the third uplink transmission being later than the predefined duration after an end symbol of downlink control information corresponding to the third uplink transmission; and
a starting symbol of the downlink control information corresponding to the third uplink transmission being later than a starting symbol of downlink control information corresponding to the second uplink transmission, or the end symbol of the downlink control information corresponding to the third uplink transmission being later than an end symbol of downlink control information corresponding to the second uplink transmission;
wherein the third uplink transmission does not overlap with the second uplink transmission in the time domain.

6. The method of claim 1, wherein the third uplink transmission corresponds to the second priority; and a transmission sequence of the third uplink transmission and the second uplink transmission is consistent with a scheduling sequence of the third uplink transmission and the second uplink transmission.

7. The method of claim 1, wherein in a case where the third uplink transmission is a PUCCH for transmitting a HARQ-ACK, the predefined duration is B1 or a sum of B1 and B2, wherein B1 is a first set value, and B2 is determined according to a processing capability reported by a terminal.

8. An uplink transmission method, comprising:
determining a starting symbol of which a transmission of a first uplink transmission is cancelled in a case where the first uplink transmission overlaps with a second uplink transmission in a time domain, wherein the first uplink transmission corresponds to a first priority, the second uplink transmission corresponds to a second priority, and the first priority is lower than the second priority; and
canceling a transmission of part or all of time domain symbols in the first uplink transmission according to the starting symbol;
wherein the starting symbol of which the transmission of the first uplink transmission is cancelled is determined according to a predefined duration, the predefined duration is determined according to types of the second uplink transmission or a third uplink transmission;
wherein the second uplink transmission comprises a plurality of dynamically scheduled second priority uplink transmissions;
time domains among the plurality of dynamically scheduled second priority uplink transmissions do not overlap;
the plurality of dynamically scheduled second priority uplink transmissions overlap with the first uplink transmission in the time domain;
wherein determining the starting symbol of which the transmission of the first uplink transmission is cancelled comprises:
determining the starting symbol of which the transmission of the first uplink transmission is cancelled according to the plurality of dynamically scheduled second priority uplink transmissions.

9. The method of claim 8, wherein the starting symbol satisfies:
starting from the predefined duration after an end symbol of downlink control information corresponding to a first dynamically scheduled second priority uplink transmission among the plurality of dynamically scheduled second priority uplink transmissions; or
starting from an earliest predefined duration in the predefined duration after an end symbol of downlink control information corresponding to each dynamically scheduled second priority uplink transmission in the plurality of dynamically scheduled second priority uplink transmissions.

10. The method of claim 8, wherein each of the plurality of dynamically scheduled second priority uplink transmissions comprises: a physical uplink control channel (PUCCH) for transmitting hybrid automatic repeat request-acknowledgement (HARQ-ACK) information with the second priority, a PUCCH for transmitting a scheduling request with the second priority, a physical uplink shared channel (PUSCH) for transmitting channel state information with the second priority, a PUCCH for transmitting a beam failure recovery (BFR) with the second priority, or a dynamically scheduled PUSCH for transmitting uplink data with the second priority; and
wherein the first uplink transmission comprises: a PUCCH for transmitting a HARQ-ACK with the first priority, a PUCCH for transmitting a scheduling request with the first priority, a PUCCH for transmitting periodic channel state information with the first priority, a PUSCH for transmitting channel state information with the first priority, a PUCCH for transmitting a BFR with the first priority, a dynamically scheduled PUSCH for transmitting uplink data with the first priority, or a semi-statically scheduled PUSCH for transmitting uplink data with the first priority.

11. The method of claim 8, wherein,
the second uplink transmission comprises a plurality of semi-statically scheduled second priority uplink transmissions;
the plurality of semi-statically scheduled second priority uplink transmissions do not overlap in the time domain;
the plurality of semi-statically scheduled second priority uplink transmissions overlap with the first uplink transmission in the time domain;
wherein determining the starting symbol of which the transmission of the first uplink transmission is cancelled comprises:

determining the starting symbol of which the transmission of the first uplink transmission is cancelled according to the plurality of semi-statically scheduled second priority uplink transmissions.

12. The method of claim 11, wherein the starting symbol satisfies:
   starting from the predefined duration before a starting symbol of a first semi-statically scheduled second priority uplink transmission; or
   starting from an earliest predefined duration in the predefined duration before a starting symbol corresponding to each semi-statically scheduled second priority uplink transmission in the plurality of semi-statically scheduled second priority uplink transmissions.

13. The method of claim 11, wherein the semi-statically scheduled second priority uplink transmission comprises: a PUCCH for transmitting a HARQ-ACK with the second priority, a PUCCH for transmitting a scheduling request with the second priority, a PUSCH for transmitting channel state information with the second priority, a PUCCH for transmitting a BFR with the second priority, or a semi-statically scheduled PUSCH for transmitting uplink data with the second priority; and
   wherein the first uplink transmission comprises: a PUCCH for transmitting HARQ-ACK with the first priority, a PUCCH for transmitting a scheduling request with the first priority, a PUCCH for transmitting periodic-channel state information with the first priority, a PUSCH for transmitting channel state information with the first priority, a PUCCH for transmitting a BFR with the first priority, a dynamically scheduled PUSCH for transmitting uplink data with the first priority, or a semi-statically scheduled PUSCH for transmitting uplink data with the first priority.

14. The method of claim 8, wherein,
   the second uplink transmission comprises at least one dynamically scheduled second priority uplink transmission and at least one semi-statically scheduled second priority uplink transmission;
   time domains between the at least one dynamically scheduled second priority uplink transmission and the at least one semi-statically scheduled second priority uplink transmission do not overlap; and
   the at least one dynamically scheduled second priority uplink transmission and the at least one semi-statically scheduled second priority uplink transmission overlap with the first uplink transmission in the time domain.

15. The method of claim 14, wherein determining the starting symbol of which the transmission of the first uplink transmission is cancelled comprises:
   determining a first starting symbol of which the transmission of the first uplink transmission is cancelled according to a first dynamically scheduled second priority uplink transmission in the second uplink transmission;
   determining a second starting symbol of which the transmission of the first uplink transmission is cancelled according to a first semi-statically scheduled second priority uplink transmission in the second uplink transmission; and
   using an earliest symbol in the first starting symbol and the second starting symbol as the starting symbol of which the transmission of the first uplink transmission is cancelled.

16. The method of claim 14, wherein determining the starting symbol of which the transmission of the first uplink transmission is cancelled comprises:

determining a third starting symbol of which the transmission of the first uplink transmission is cancelled according to each dynamically scheduled second priority uplink transmission in the second uplink transmission;
determining a fourth starting symbol of which the transmission of the first uplink transmission is cancelled according to each semi-statically scheduled second priority uplink transmission in the second uplink transmission; and
using an earliest symbol in the third starting symbol and the fourth starting symbol as the starting symbol of which the transmission of the first uplink transmission is cancelled.

17. An uplink transmission device, comprising:
at least one processor; and
a storage device, which is configured to store at least one program;
wherein the at least one program, when executed by the at least one processor, causes the at least one processor to perform:
canceling a transmission of part or all of time domain symbols in a first uplink transmission according to a starting symbol of which the transmission of the first uplink transmission is cancelled in a case where the first uplink transmission overlaps with a second uplink transmission in a time domain, wherein the first uplink transmission corresponds to a first priority, the second uplink transmission corresponds to a second priority, and the first priority is lower than the second priority; and
transmitting a third uplink transmission through time domain symbols of which the transmission is cancelled in the first uplink transmission in a case where a set condition is satisfied;
wherein the starting symbol of which the transmission of the first uplink transmission is cancelled is determined according to a predefined duration, the predefined duration is determined according to types of the second uplink transmission or the third uplink transmission;
wherein the third uplink transmission corresponds to the first priority, and a scheduling type of the third uplink transmission is a semi-static scheduling; and
wherein the set condition comprises:
the predefined duration before a starting symbol of the third uplink transmission being later than a starting symbol or an end symbol of downlink control information corresponding to the second uplink transmission;
wherein the first uplink transmission or the third uplink transmission comprises: a physical uplink control channel (PUCCH) for transmitting hybrid automatic repeat request-acknowledgement (HARQ-ACK) information with the first priority, a PUCCH for transmitting a scheduling request with the first priority, a PUCCH for transmitting periodic-channel state information with the first priority, a physical uplink shared channel (PUSCH) for transmitting channel state information with the first priority, a PUCCH for transmitting a beam failure recovery (BFR) with the first priority, a dynamically scheduled PUSCH for transmitting uplink data with the first priority, or a semi-statically scheduled PUSCH for transmitting uplink data with the first priority; and
wherein the second uplink transmission comprises: a PUCCH for transmitting a HARQ-ACK with the second priority, a PUCCH for transmitting a scheduling request with the second priority, a PUSCH for transmitting channel state information with the second priority, a PUCCH for transmitting a BFR with the second priority, a dynamically scheduled PUSCH for transmitting uplink data with the second priority, or a semi-statically scheduled PUSCH for transmitting uplink data with the second priority.

* * * * *